(12) United States Patent
Bendale et al.

(10) Patent No.: US 10,769,438 B2
(45) Date of Patent: Sep. 8, 2020

(54) AUGMENTED REALITY

(71) Applicant: Samsung Electronics Company, Ltd., Suwon si, Gyeonggi-do (KR)

(72) Inventors: Abhijit Bendale, Mountain View, CA (US); Jason Yeh, Mountain View, CA (US); Brian Harms, San Jose, CA (US); Sergio Perdices-Gonzalez, Santa Clara, CA (US); Cathy Kim, San Jose, CA (US); Michael Noh, Mountain View, CA (US); Ruokan He, Mountain View, CA (US); Simon Gibbs, San Jose, CA (US); Jihee Kim, Mountain View, CA (US); Anthony Liot, Cupertino, CA (US); Pranav Mistry, Cupertino, CA (US); Yingying Ren, Mountain View, CA (US); Sajid Sadi, San Jose, CA (US); Anil Unnikrishnan, Mountain View, CA (US); Link Huang, San Jose, CA (US)

(73) Assignee: SAMSUNG ELECTRONICS COMPANY, LTD., Suwon si, Gyeonggi-Do (KR)

( * ) Notice: Subject to any disclaimer, the term of this patent is extended or adjusted under 35 U.S.C. 154(b) by 0 days.

(21) Appl. No.: 15/985,604

(22) Filed: May 21, 2018

(65) Prior Publication Data
US 2018/0341811 A1    Nov. 29, 2018

Related U.S. Application Data

(60) Provisional application No. 62/510,064, filed on May 23, 2017, provisional application No. 62/644,135, filed on Mar. 16, 2018.

(51) Int. Cl.
*G06K 9/00* (2006.01)
*G06T 7/70* (2017.01)
(Continued)

(52) U.S. Cl.
CPC ..... *G06K 9/00671* (2013.01); *G02B 27/0172* (2013.01); *G06T 7/11* (2017.01);
(Continued)

(58) Field of Classification Search
CPC ......... G06K 9/00671; G06T 7/70; G06T 7/11; G06T 7/20; G06T 7/593;
(Continued)

(56) References Cited

U.S. PATENT DOCUMENTS

| 8,896,686 B2 | 11/2014 | Chen |
| 9,024,972 B1 | 5/2015 | Bronder |

(Continued)

FOREIGN PATENT DOCUMENTS

| JP | 6268704 | 1/2018 |
| KR | 20150028589 | 3/2015 |

OTHER PUBLICATIONS

International Search Report and Written Opinion for Application No. PCT/KR2018/005839, dated Sep. 20, 2018.

(Continued)

*Primary Examiner* — Abhishek Sarma
(74) *Attorney, Agent, or Firm* — Baker Botts L.L.P.

(57) ABSTRACT

In one embodiment, a computing system may access one or more frames of media content with each frame corresponding to at least part of an image. The computing system may automatically detect at least one object in at least one of the one or more frames. The computing system may automatically identify the at least one object. For each of the identified objects, the computing system may automatically determine an annotation corresponding to that object and each annotation may include one or more graphical elements. For each annotation, the computing system may automatically associate that annotation for display with its corresponding object.

20 Claims, 20 Drawing Sheets

(51) Int. Cl.
*G06T 7/11* (2017.01)
*G06T 7/20* (2017.01)
*G06T 7/593* (2017.01)
*G02B 27/01* (2006.01)
*G06T 19/00* (2011.01)

(52) U.S. Cl.
CPC .............. *G06T 7/20* (2013.01); *G06T 7/593* (2017.01); *G06T 7/70* (2017.01); *G02B 2027/0138* (2013.01); *G06T 19/006* (2013.01); *G06T 2207/10016* (2013.01)

(58) Field of Classification Search
CPC ........ G06T 2207/10016; G06T 19/006; G02B 27/0172; G02B 2027/0138
See application file for complete search history.

(56) References Cited

U.S. PATENT DOCUMENTS

| | | |
|---|---|---|
| 9,153,195 B2 | 10/2015 | Geisner |
| 9,898,666 B2 | 2/2018 | Kang |
| 2007/0002039 A1 | 1/2007 | Pendleton |
| 2009/0116732 A1 | 5/2009 | Zhou |
| 2010/0045799 A1 | 2/2010 | Lei |
| 2010/0085383 A1 | 4/2010 | Cohen |
| 2012/0218172 A1 | 8/2012 | Border |
| 2014/0253743 A1 | 9/2014 | Loxam |
| 2015/0153570 A1 | 6/2015 | Yamamoto |
| 2016/0021360 A1 | 1/2016 | Nishizawa |
| 2017/0148222 A1 | 5/2017 | Holzer |
| 2017/0359569 A1 | 12/2017 | Stafford |
| 2017/0364162 A1 | 12/2017 | Fujimaki |

OTHER PUBLICATIONS

M. Moriyama et al., "Moving Object Detection in HEVC Video by Frame Sub-sampling", 2015 International Symposium on Intelligent Signal Processing and Communication Systems (ISPACS), Nov. 12, 2015.

European Patent Application No. 18805158.5 Partial European Search Report, dated May 12, 2020, 21 pages.

Quintana, Eduardo et al. "Augmented reality annotations to assist persons with Alzheimers and their caregivers," Personal and Ubiquitous Computing, Springer Verlag, London Limited 2012, GB (published online: May 15, 2012), vol. 17, No. 6, Aug. 1, 2013, XP058036865, ISSN: 16174909, DOI: 10.1007/S00779-012-0558-6, pp. 1105-1116 (12 pages).

Wither, Jason, et al. "Annotation in outdoor augmented reality," Computers and Graphics, Elsevier, GB, vol. 33, No. 6, Dec. 1, 2009, XP026791205, ISSN: 0097-8493 [retrieved on Jun. 17, 2009], pp. 679-689 (11 pages).

AUGMENTED REALITY

PRIORITY CLAIM

This application claims the benefit, under 35 U.S.C. § 119(e), of U.S. Provisional Patent Application No. 62/510,064 filed 23 May 2017 and U.S. Provisional Patent Application No. 62/644,135 filed 16 Mar. 2018, both of which are incorporated herein by reference

TECHNICAL FIELD

This disclosure generally relates to augmented reality (AR) and virtual reality (VR).

BACKGROUND

AR and VR can provide an immersive experience to users by displaying images and videos to the user that the user can interact with, for example by selecting which view of the AR or VR content to view. AR and VR content may be three-dimensional (3D) and have a 360-degree field of view. AR and VR may be displayed to a user on a headset worn by the user. The AR and VR headsets can be worn on the user's head and can display images and videos to the user in a virtual space or a mix of the virtual and real-world space. AR may provide users a direct or indirect view of an environment and augment one or more elements of that environment using computer-generated or user-generated content. VR may provide users a view of a virtual environment created based on computer-generated content, pre-recorded content, and/or live content. AR may alter users' current perception of a real-world environment while VR may replace the real-world environment with a simulated environment or a real-world environment remote (either in time or place, or both) from the user. AR and VR may be used together so that a simulated environment or a real-world environment remote from the user is also augmented with computer-generated or user-generated content.

DESCRIPTION OF EXAMPLE EMBODIMENTS

Figure 1:
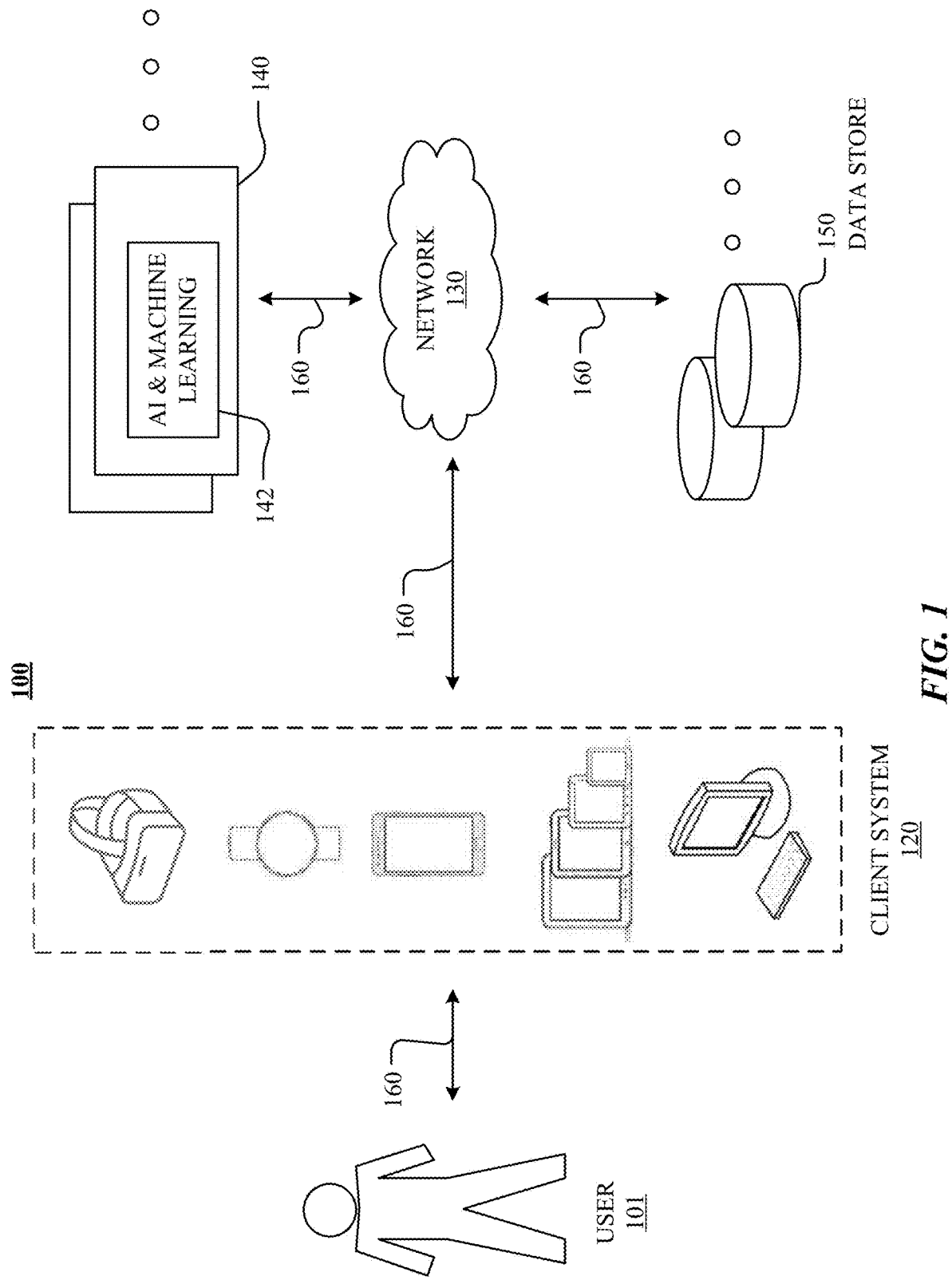
FIG. 1 illustrates an example network environment of an example AR system.

FIG. 1 illustrates an example network environment 100 of an example AR system. Network environment 100 includes one or more users 110, client systems 120, networks 130, servers 140, and data stores 150. Client system 120, servers 140, and data stores 150 may be connected to each other by network 130 via links 160. Although FIG. 1 illustrates a particular arrangement of user 110, client system 120, network 130, servers 140, and data stores 150, this disclosure contemplates any suitable arrangement of user 110, client system 120, network 130, servers 140, and data stores 150. As an example and not by way of limitation, two or more of client systems 120, servers 140, and data stores 150 may be connected to each other directly, bypassing network 130. As another example, two or more of client systems 120, servers 140, and data stores 150 may be physically or logically co-located with each other in whole or in part. Moreover, although FIG. 1 illustrates a particular number of users 110, client systems 120, networks 130, servers 140, and data stores 150, this disclosure contemplates any suitable number of user 110, client system 120, network 130, servers 140, and data stores 150. As an example and not by way of limitation, network environment 100 may include multiple users 110, client systems 120, networks 130, servers 140, and data stores 150.

In particular embodiments, user 110 may be an individual (e.g., human user), an entity (e.g., an enterprise, business, or third-party application), or a group (e.g., of individuals or entities) that interacts or communicates with client system 120. In particular embodiments, client system 120 may be any suitable computing device, such as, for example, a wearable computing device, an AR headset, a VR headset, a mixed reality headset, a mobile computing device, a smartphone, a smartwatch, a cellular telephone, a tablet computer, a laptop computer, a personal computer, an augmented/virtual reality device, or any combination thereof. User 110 may interact with one or more of these devices. In addition, these devices may communicate with each other via network 130, directly (e.g., by non-network connections), by any other suitable methods, or any combination thereof. As an example and not by way of limitation, the devices of client system 120 may communicate with network 130 via a wireless communications protocol, such as Wi-Fi or BLUETOOTH. In particular embodiments, client system 120 may include a web browser, such as MICROSOFT INTERNET EXPLORER, GOOGLE CHROME or MOZILLA FIREFOX, and may have one or more add-ons, plug-ins, or other extensions, such as YAHOO TOOLBAR. A user of client system 120 may enter a Uniform Resource Locator (URL) or other address directing the web browser to a particular server (such as server 140), and the web browser may generate a Hyper Text Transfer Protocol (HTTP) request and communicate the HTTP request to server. The server may accept the HTTP request and communicate to client system 120 one or more Hyper Text Markup Language (HTML) files responsive to the HTTP request. Client system 120 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, network 130 may be any suitable network. As an example and not by way of limitation, one or more portions of network 130 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 130 may include one or more networks.

In particular embodiments, links 160 may connect client system 120, servers 140, and data stores 150 to network 130 or to each other. This disclosure contemplates any suitable links 160. In particular embodiments, one or more links 160 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 160 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 160, or a combination of two or more such links 160. Links 160 need not necessarily be the same throughout network environment 100. One or more first links 160 may differ in one or more respects from one or more second links 160.

In particular embodiments, servers 140 may be any suitable servers. Each server 140 may be a unitary server or a distributed server spanning multiple computers or multiple datacenters. Servers 140 may be of various types, such as, for example and not by way of limitation, web server, file server, application server, exchange server, database server, proxy server, another server suitable for performing functions or processes described herein, or any combination thereof. In particular embodiments, each server 140 may include hardware, software, or embedded logic components or a combination of two or more such components for carrying out the appropriate functionalities implemented or supported by server 140. In particular embodiments, servers 140 may include one or more artificial intelligence (AI) and machine learning (ML) algorithms 142. In particular embodiments, one or more artificial intelligence (AI) and machine learning (ML) algorithms may be implemented in client system 120. In particular embodiments, the artificial intelligence (AI) and machine learning (ML) algorithms may be deep learning algorithms. In particular embodiments, the data store 150 may include a data base including a number of meal pictures. In particular embodiments, the artificial intelligence (AI) and machine learning (ML) algorithms 142 may analyze data stored in data stores 150 and provide analyzing results to user 110 through client system 120.

In particular embodiments, data stores 150 may be any suitable data stores. Data stores 150 may be used to store various types of information. In particular embodiments, the information stored in data stores 150 may be organized according to specific data structures. In particular embodiments, each data store 150 may be a relational, columnar, correlation, or other suitable database. Data store 150 may include networked storage such as cloud storage or other network accessible storage. Additionally or alternatively, data store 150 may include local storage within or directly attached to any of the devices of client system 120, such as solid state drives ("SSDs") or hard disk drives ("HDDs"). The network environment illustrated in FIG. 1 is for example only and the network environments are not limited thereof. Although this disclosure describes or illustrates particular types of components and uses of these components of network environment 100, this disclosure contemplates any suitable types of components, any suitable network topology (e.g., including a standalone-device topology), and any suitable uses for these components of network environment 100.

Figure 2:
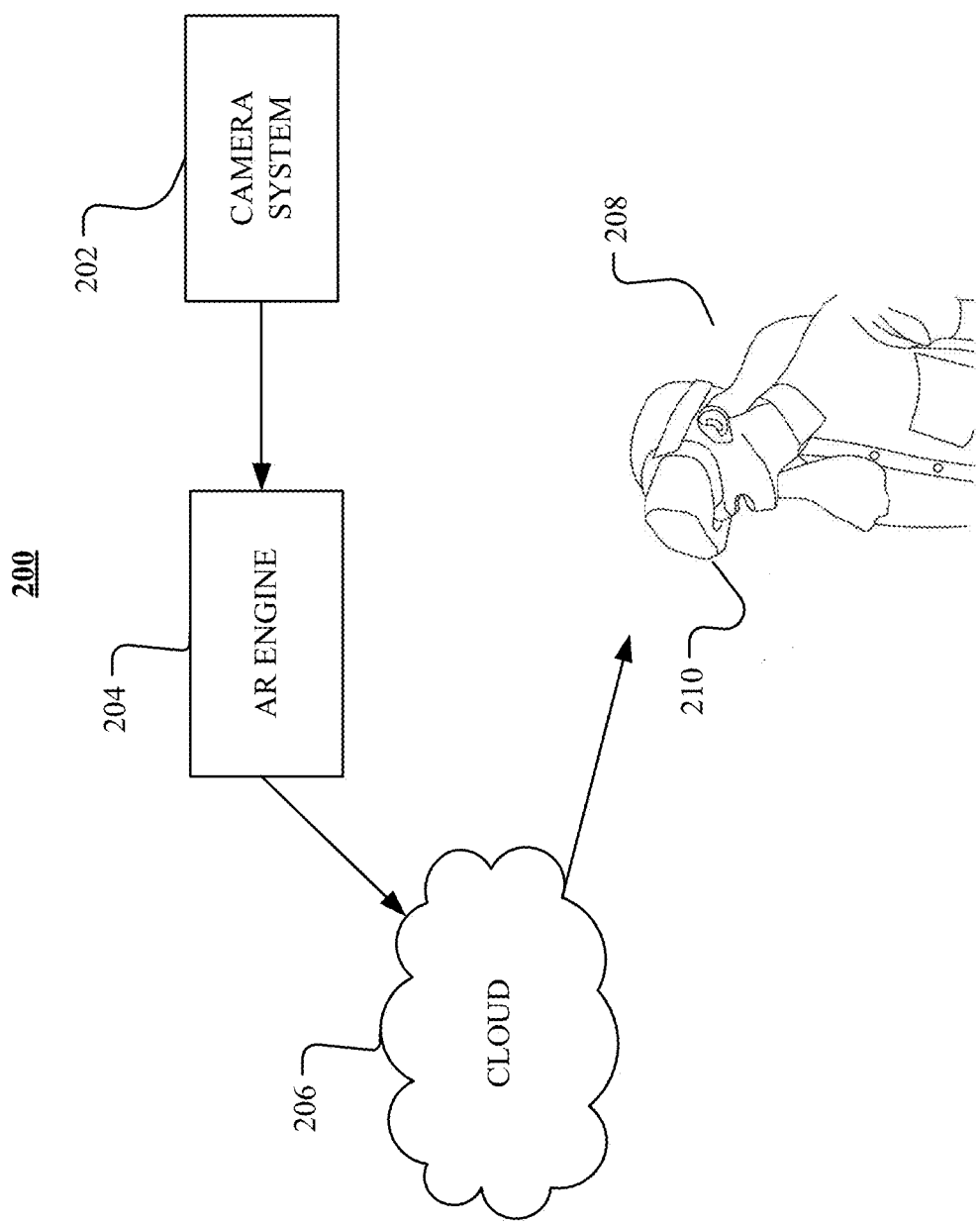
FIG. 2 illustrates an example AR system.

FIG. 2 illustrates an example AR system 200. In particular embodiments, AR system 200 may include a camera system 202, an AR engine 204, a cloud network 206 ("cloud 206"), and an AR headset 210 worn by a user 208. While the AR headset 210 in FIG. 2 provides an enclosed viewing screen, this disclosure contemplates any suitable headset for viewing AR content. In particular embodiments, the camera system 202 may be located at a remote location to the AR headset 210 worn by the user 208. In particular embodiments, the camera system 202 may be located at the same location to the AR headset 210 worn by the user 208. The camera system 202 may include one or more cameras, for example, but not limited to, a stereoscopic 360-degree camera, a stereo camera pair, a conventional camera with a field of view (FOV), an infrared thermal camera, etc. The camera system may also include one or more sensors including, for example, but not limited to, a microphone, a motion sensor, an accelerometer, a gyroscope, a light sensor, a direction sensor, an inertial measurement unit, etc. In particular embodiments, the camera system 202 may capture one or more frames of a media content including, for example, images (including still images and/or video) and/or audio. Each frame of the media content may correspond to at least part of an image captured by one or more cameras.

The camera system 202 may transmit the captured media content to the AR engine 204 which processes the media content. The AR Engine 204 may combine the images or videos captured by the cameras with some annotations in order to generate augmented media content (e.g., images with annotations). In particular embodiments, the annotations may include, for example, text, information overlays, graphics, sounds, touch feedback, links to additional layers of information, video/audio content, recommendations, lyrics, musical instruments, screens (e.g., TV screen shown on display), holograms, user comments, search boxes, social media-related items (e.g., tweets, post, likes), etc. In particular embodiments, annotations may be automatically added to an image based on metadata associated with that image. In particular embodiments, the annotations may include, for example, but not limited to, an event (e.g., a sports event) associated with the image, a location of the event, a time of the event, a recommendation to the user (e.g., recommendation for a place to go), etc. In particular embodiments, annotations may be manually added to images by users. As an example and not by way of limitation, the manually added annotations may include user-generated comments.

In particular embodiments, annotations may be based on user interests and/or event highlights. For example, if AR system 200 determines that the user is interested in shoes, then an annotation may provide information on shoes in the AR content being displayed to that user. Annotations to content may be based on user interactions with the content and/or on social highlights in the content made by other people. As an example and not by way of limitation, for user interactions, when the user interacts with an audience to see who is in the audience, one or more annotations may include the names of people in the audience. As another example and not by way of limitation, for social highlights, when multiple users or friends want to share a view of the earth, an annotation corresponding to each user's view of the earth may be added to the content.

In particular embodiments, an annotation may refer to one or more specific objects within content a user is viewing. In particular embodiments, such annotations may be positioned close to or on the corresponding objects within the AR media content. In particular embodiments, annotations may be associated with the corresponding objects based on the corresponding objects' properties including, for example, shape, size, surface direction, spatial relationship with cameras, spatial relationship with other objects, etc. In other words, annotations may share one or more of an associated object's properties, thus identifying the annotation as being associated with the object. In particular embodiments, annotations may be added to the media content as an overlay or a tag. In particular embodiments, the user 208 may modify the annotations or add additional annotations to the AR media content. In addition, the user 208 may share the AR media content with one or more other users in the AR environment. In particular embodiments, the annotations may be interactive based on the visual or audio content currently being viewed by the user 208 wearing the AR headset 210. As an example and not by way of limitation, if the user 210 is viewing a person making a presentation in the AR media content, the annotations may be the speaker's PowerPoint presentation material. As another example and not by way of limitation, if the user 210 is viewing the audience of the presentation in the AR media content, the annotation may be the name and title of an audience member.

In particular embodiments, images may include pre-tagged items. For example, an image of a grocery store may have pre-tagged fruits such as apple, orange, raspberry, banana, etc. The pre-tagged items may have pre-defined interactions associated with each item. For example, when the user selects a tagged apple, an annotation may appear providing additional information about the apple or how to purchase the apple. In addition, in particular embodiments, the user may select dynamic/on-demand items to provide on-demand interactions. For example, if the user touches a surface, an annotation may appear on the touched surface to show the material of the surface. As another example, if the user looks at an object in a distance, an annotation may show the size information of the object. Other contextual data may also be presented. For example, if a user interacts with or otherwise indicates a table, then an annotation may appear describing what type of chair may fit the style of the table.

In particular embodiments, the AR headset 210 may include a head mounted-display (HDM), one or more cameras, one or more sensors (e.g., sensors for tacking the user's head position and motion), processors, storage, communication modules, and other modules supporting various functionalities. The AR engine 204 may generate and transmit the AR media content with annotations to the AR headset 210 though the cloud 206. The AR headset 210 may display the AR media content to the user 208. In particular embodiments, the AR media content displayed on the AR headset 210 to the user 208 may include a live view of a scene captured by and transmitted from the camera system 202 in real-time. In particular embodiments, the AR media content displayed on the AR headset 210 may include a pre-recorded media content. Although this disclosure describes an AR system having particular components, this disclosure contemplates an AR system with any suitable components.

Figure 3A:
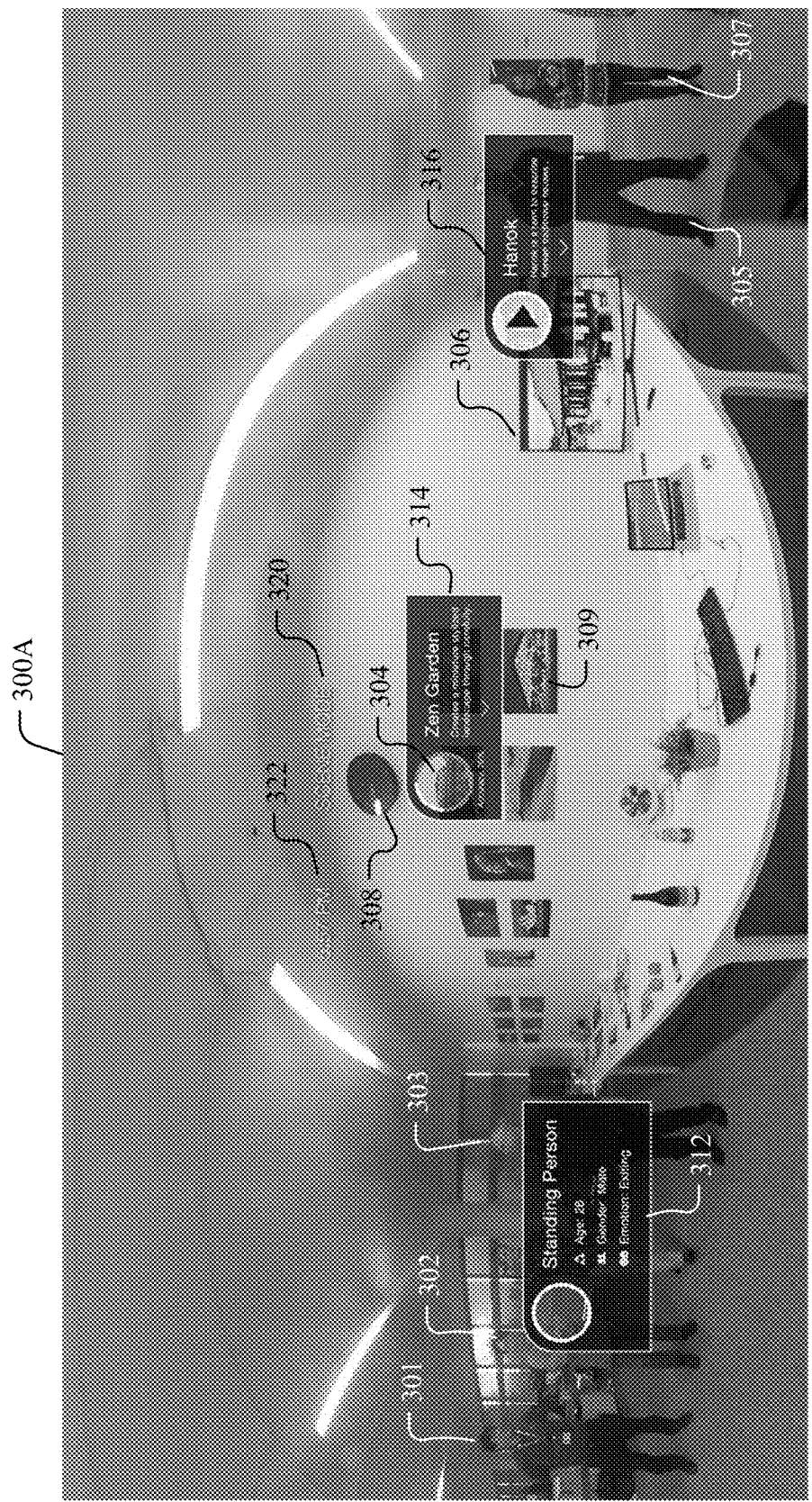
FIG. 3A illustrates an example scene of an office space with annotations.

In particular embodiments, remote augmented reality (RAR) may allow users to interact with immersive media content via annotations. Such content may be 360-degree content, but this disclosure contemplates that the content may also include less than 360-degrees of view. The annotations may include additional information presented in conjunction with the media content. Annotations may be related to the one or more objects in the media content. FIG. 3A illustrates an example scene 300A of an office space with annotations. The scene 300A may include a number of people (e.g., 301, 302, 303, 305, 307), a number of pictures on wall (e.g., 304, 309), a clock on wall 308, a number of annotations (e.g., 312, 314, 316), text information (e.g., 320, 320), a TV 306, and other objects (e.g., a laptop computer, a keyboard, etc.). As an example and not by way of limitation, the annotation 312 is associated with the person 302 and may include information about the person 302, such as, age, gender, emotional state, etc. The information in the annotation 312 may be determined and added by the system automatically or may be added by one or more users of the system. The annotation 312 may further include an identification assigned to the person 302 by the system (e.g., "standing person" or the person's name) based on face detection and face recognition results. The annotation 312 may be translucent allowing user to partially see through the annotation 312 while clearly displaying the annotation content. The annotation 312 may include a transparent area allowing users to see the associated person 302 behind the annotations 312.

As another example and not by way of limitation, the annotation 314 may be associated with the picture 304 and may include a place name identified from the picture 304 (e.g., Zen Garden), a description of the place, an accuracy level (e.g., 75%), a button icon for more information, etc. In particular embodiments, the accuracy level may correspond to an estimation regarding the accuracy of the information displayed in the annotation. The annotation 314 may further include a transparent area allowing users to see the associated picture 304 behind the annotation 314. As another example and not by way of limitation, the annotation 316 may be associated with the TV 306. The annotation 316 may include a first interactive icon for the user to play content on TV 306, a text description, a second interactive icon for the user to get more information, etc. The text information 322 may display the current time of the system (e.g., user's local time) and the text information 320 may display the scene mode being displayed to the user. Although this disclosure describes a scene with annotation having particular components, this disclosure contemplates any scene with any annotation with any suitable components.

Figure 3B:
FIG. 3B illustrates an example scene of an office space with annotations and a mask for a selected object.

FIG. 3B illustrates an example scene of an office space with annotations and a mask for a selected object. The scene 300B may include people and objects similar to the scene 300A. In particular embodiments, the system may select one or more objects in a scene based on, e.g., user interaction with the scene or user interests, and add masks and annotations for the selected object(s). As an example and not by way of limitation, the clock 308 may be selected in the scene 300B. The system may determine a mask 330 based on the shape and location of the clock 308 and add the mask 330 to the clock 308. The system may determine the time from the clock 308 as part of the content of the annotation 318 and associate the annotation 318 to the clock 308. The annotation 318 may include an object identification (e.g., Wall Clock) for the clock 308, a time (e.g., 08:44 PM) of the scene 300B, a date (e.g., Tue Feb 28) of the scene 300B, time zone information (e.g., Pacific Time Zone) of the scene 300B, etc. The system may further display text information, such as text 324 for home button, text 326 for indicating the viewing mode being displayed, and text 322 for the system time. Although this disclosure describes a scene with annotation having particular components, this disclosure contemplates any scene with any annotation with any suitable components.

As illustrated above, a "mask" for an object visually identifies the object by giving it some emphasis relative to its surroundings. Emphasis may take any suitable form, such as brightness, color, animations such as pulsing, etc. In particular embodiments, providing a mask for an object helps a user identify which object a displayed annotation corresponds to. As illustrated in FIG. 3B, a mask may take the shape of the object it corresponds to.

Figure 3C:
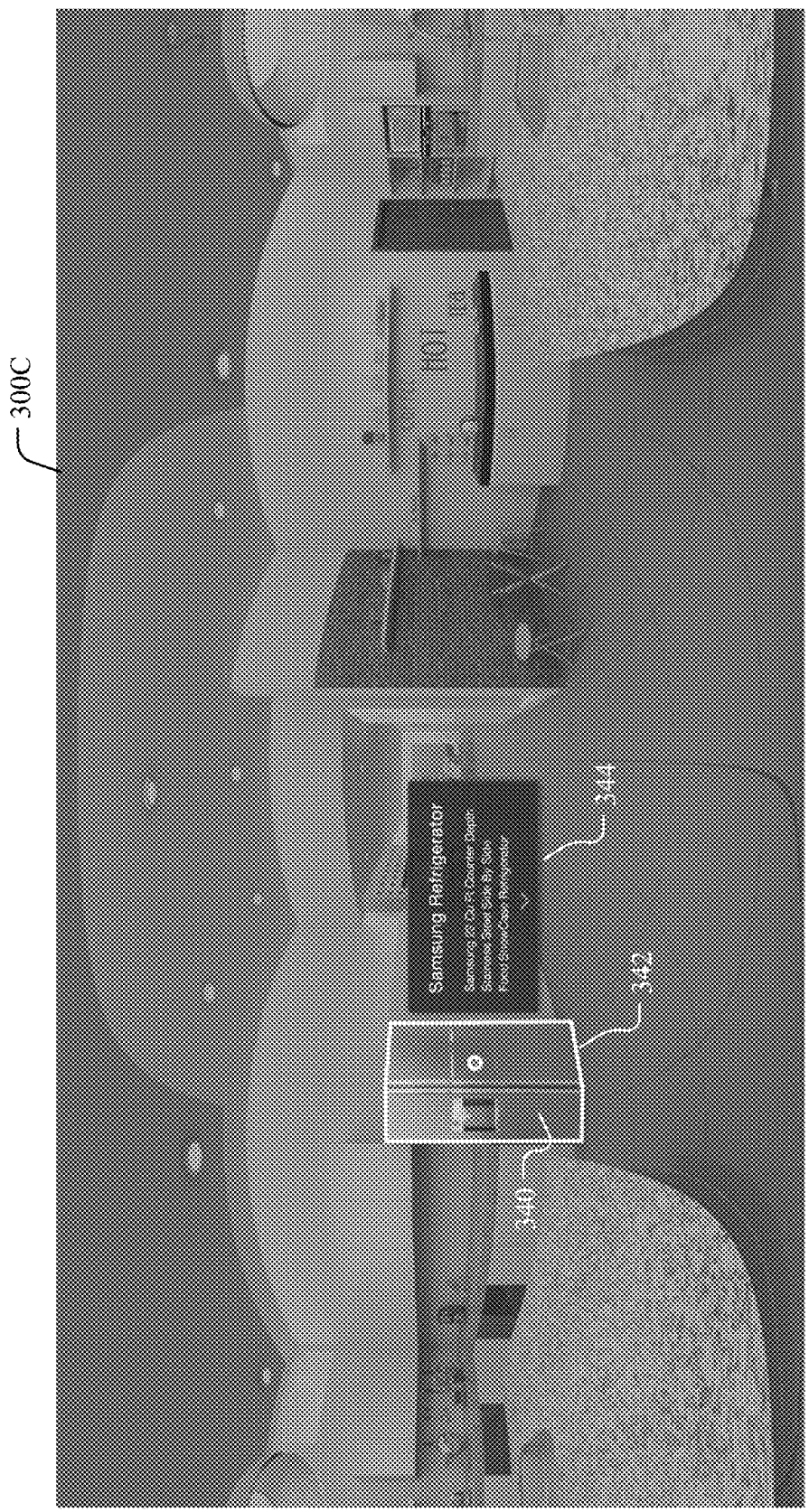
FIG. 3C illustrates an example scene of a home space with annotations and a mask for a selected object.
Figure 3D:
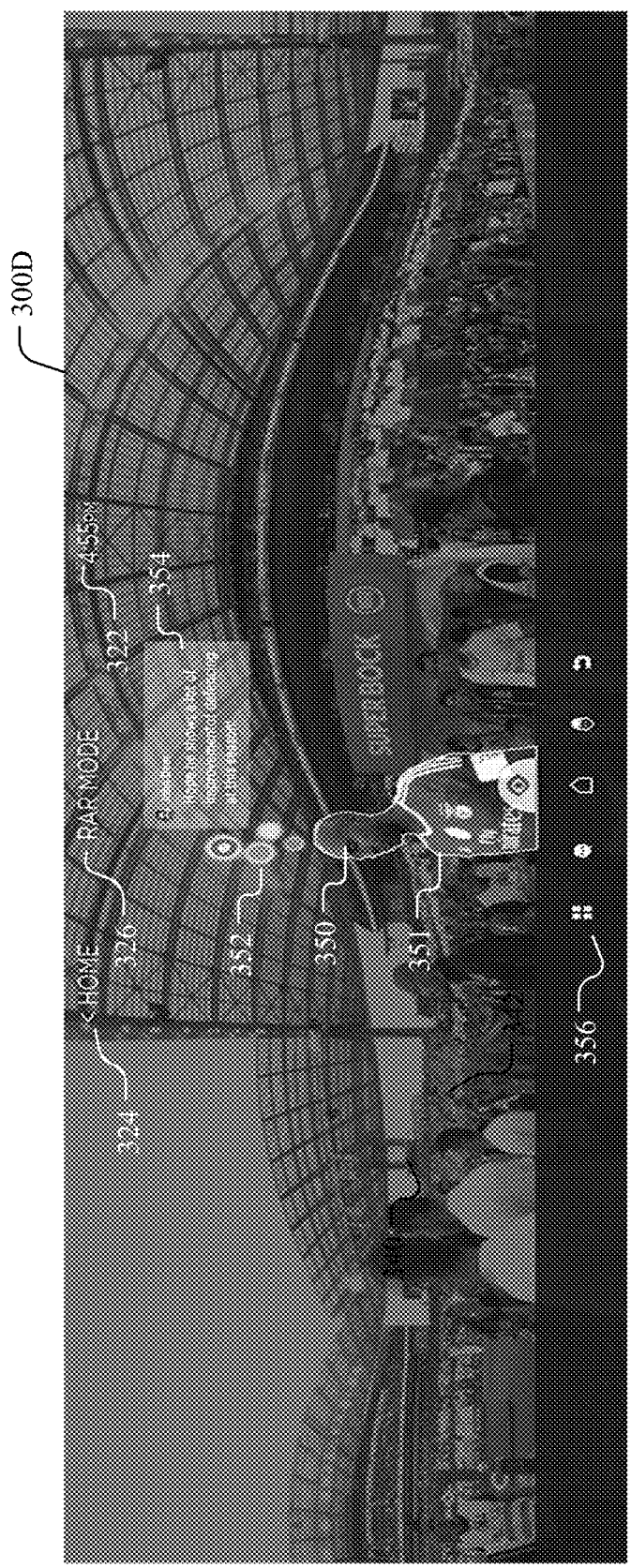
FIG. 3D illustrates an example scene of a sports event with annotations shared by another user.

FIG. 3C illustrates an example scene 300C of a home space with annotations and a mask for a selected object. In this example, the system may select the refrigerator 340 in the scene 300C and determine the mask 342 and the annotation 344 for the refrigerator 340. The annotation 340 may include, for example, an object identification (e.g., Samsung Refrigerator), a text description, an interactive icon for more information, etc. FIG. 3D illustrates an example scene 300D of a sports event with annotations, at least some of which are shared by another user. In particular embodiments, the system may determine a person of interest or an object of interest in a scene based on a first user's interaction with the scene, a second user's interaction with the scene, or an interaction between the first user and a second user about the scene. In particular embodiments, the system may allow one or more users to create and add annotations to one or more objects of interest or people of interest. In this example, the system may determine that the person 350 in the scene 300D is the person of interest. A second user may be interacting with the first user who is viewing the scene 300D. The second user may create the annotation 354 and associate the annotation 354 to the person 350 in the scene 300D. The annotation 354 may include a thumbnail picture of the second user, name of the second user (e.g., John Deer), and a text description including comments from the second user. The system may further create and associate a mask 351 correspond to person 350. The system may add one or more effects (e.g., AR circles 352) indicating that the annotation 354 is associated with the person 350. The scene 300D may further include a menu 356, text information for the system (e.g., 324 for home button, 326 for RAR mode, 322 for time), etc. Metadata based on a popular viewing scene can work in conjunction with multiple cameras viewing the same scene, allowing the viewer to switch to alternate viewing angles by user selection. Switching between views may also or in the alternative be automated, e.g., through system settings. Although this disclosure describes a scene with annotation having particular components, this disclosure contemplates any scene with any annotation with any suitable components.

Figure 3E:
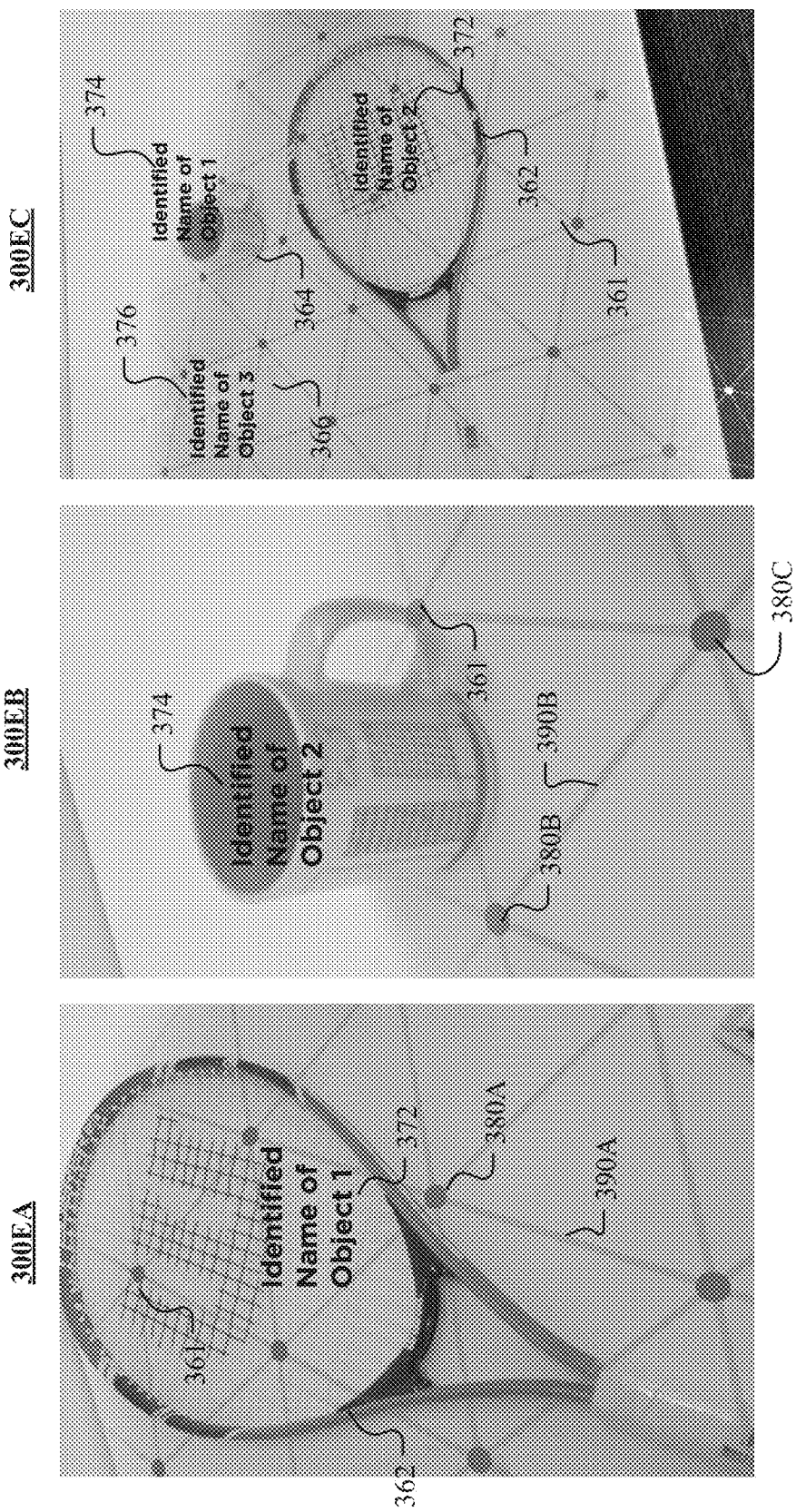
FIG. 3E illustrates example scenes of multiple objects with annotations and spatial information.

FIG. 3E illustrates example scenes of multiple objects with annotations and spatial information. In the example of FIG. 3E, annotations 372, 374, and 376 correspond to the identified names of the corresponding object, e.g., "tennis racquet" for annotation 372. In particular embodiments, the annotations may be associated with the corresponding objects based on spatial information of the corresponding objects and the scene. As an example and not by way of limitation, the scene 300EA may include a racket 362, an annotation 372, and a virtual grid 361. The virtual grid 361 may be composed of dots (e.g., 380A, 380B, 380C) and lines (e.g., 390A, 390B) connecting the dots. In particular embodiments, the virtual grid may be projected on one or more surfaces (e.g., ground surface) in the scene based on the spatial understanding of the scene to provide spatial information of the objects and the scene to allow the annotations to be appropriately positioned. In this example, the virtual grid 361 may be projected on the ground surface on which the racket is put on. The annotation 372 may be rendered on a surface parallel to the ground surface, as indicated by the virtual grid. As another example and not by way of limitation, the scene 300EB may include a cup 364, an annotation 374, and the virtual grid 361. The annotation 374 may be put on a surface on the top of the cup and parallel to the ground surface. The position of the annotation 374 may be based on the ground surface angle and the height of the cup 371. As another example and not by way of limitation, the scene 300EC may include multiple objects (e.g., a racket 362, a cup 364, a teapot 366) on the ground surface. The virtual grid 361 may be used to determine the spatial information of the objects (e.g., size, position, direction) and the spatial relationship of the objects. In particular embodiments, the system may use the spatial information of the scene and the objects in the scene to determine the camera position parameters including, for example, but not limited to, cameras position, distance to the objects in the scene, and direction with respect to objects in the scene. The virtual grid illustrated in FIGS. 3EA-C may or may not be displayed to a user viewing the associated content.

As another example of annotations, a 360-degree image from a video of a scene in a zoo may show an elephant, an annotation indicating the type of elephant, a nearby zoo where elephants can be found, or a link to online streaming media content about elephants. As another example, a 360-degree image from a video of a scene in a city street may show a person, an annotation indicating the person's age, gender, and emotional state. As another example, a 360-degree image from a video of a scene in a wild field may show a deer, an annotation indicating the deer's type, habit, places where the deer can be found, and a map of the field.

In particular embodiments, an AR annotation system may include a content processing pipeline that automatically produces annotations for AR content. In particular embodiments, the system may provide a 360-degree video processing pipeline for constructing RAR annotations. The system may be configured to construct different types of annotations. In particular embodiments, the system may operate in an offline mode, in which the system may process pre-recorded 360-degree content for annotations. In particular embodiments, the system may operate in an online mode, in which the system may process live 360-degree media content for annotations. In particular embodiments, annotations may be produced automatically by the system or manually by users or by a combination of automatic and manual processes. In particular embodiments, the system may automatically produce AR annotations based on one or more computer vision techniques including, for example, but not limited to, convolutional neural networks (CNNs), deep learning (DL) models, machine learning (ML) models, or other computer vision techniques (e.g., image classification, object detection, object recognition, etc.). In some embodiments, the system may use a combination of one or more DL models and/or one or more traditional machine learning (ML) models. While particular embodiments of this disclosure describe annotations as being applied to 3D images and/or 360-degree content, this disclosure contemplates that annotations may be applied to 2D video and/or to content that provides less than a 360-degree field of view.

In particular embodiments, an AR system may be an end-to-end pipeline for extracting information from media content, such as a 360-degree video. In particular embodiments, the system may use computer vision technologies for specific tasks such as object detection and scene segmentation. As described more fully below, in particular embodiments the system may accommodate one or more technical characteristics of a 360-degree video (e.g., high resolution, non-linear projection, potentially stereo, etc.) to DL network models; may aggregate and synchronize results from multiple DL network models; and the system may utilize changes between images (or lack thereof) to reduce DL computation.

Figure 4:
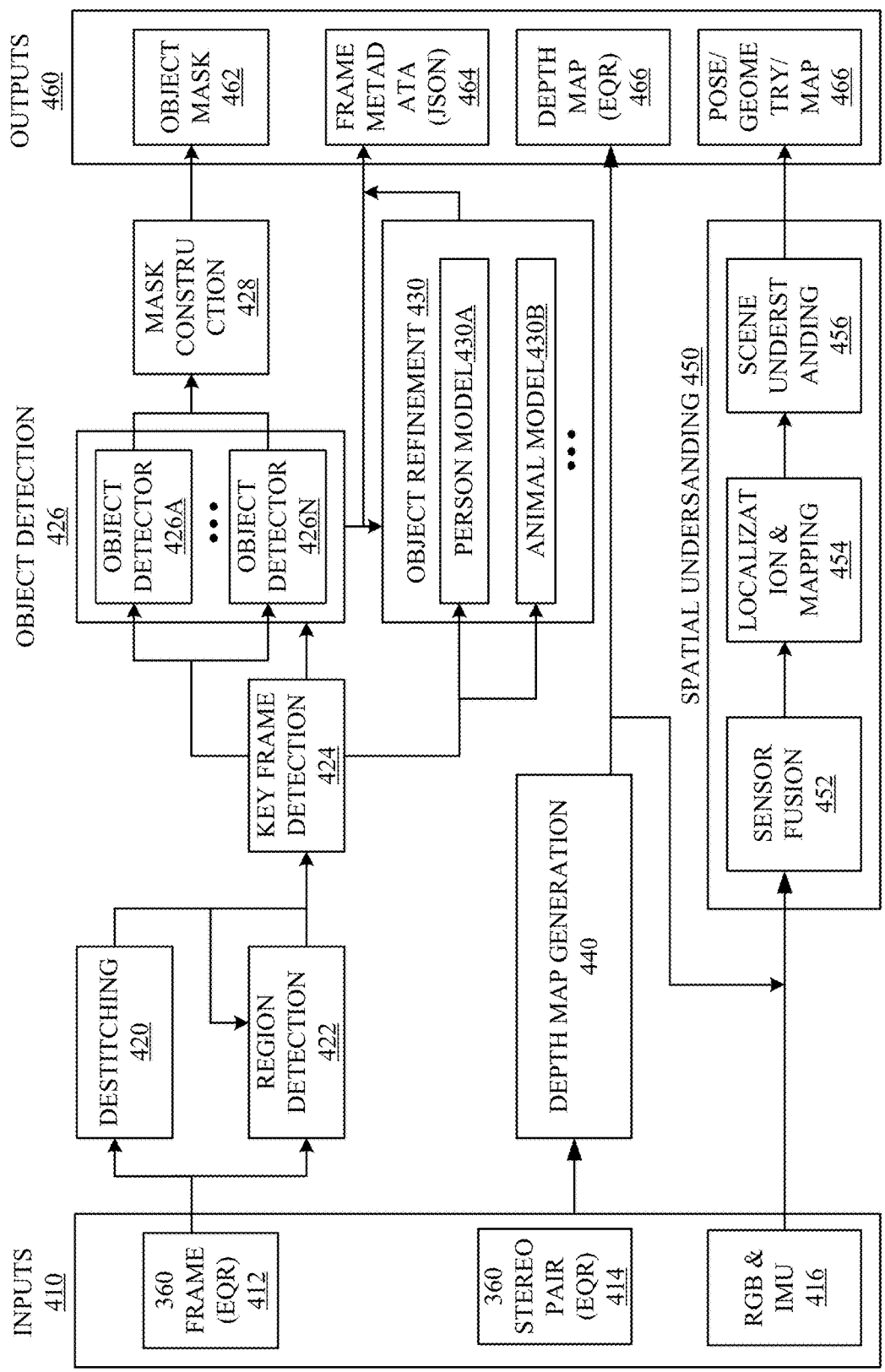
FIG. 4 illustrates a diagram of an example AR annotation system.

FIG. 4 illustrates a diagram of an example AR annotation system 400. In particular embodiments, the system 400 may have one or more inputs 410 to the pipeline. The inputs 410 may include, for example, any of: a sequence of 360-degree video frames 412; a sequence of mono or stereo frame pairs 414; a sequence of conventional RGB frames with inertial measurement unit data 416; and other sensor data. In particular embodiments, the input frames may be high resolution frames, for example, 4K or higher resolution. In particular embodiments, the input video may be in an equirectangular (EQR) format, a cubemap format, a hemisphere pair format, or a conventional planar RGB format. In particular embodiments, the system may have the pipeline configured to run on non-360 images including, for example, 180-degree images, cylindrical images, or conventional images.

In particular embodiments, the system 400 may include a destitching system 420. In particular embodiments, the destitching system 420 may facilitate dividing an input frame into many lower-resolution image tiles suitable for input to the DL and ML engines. As an example and not by way of limitation, the input frames to the destitching system 420 may have 4K or higher resolution and the destitched image tiles may have a resolution of 200 pixels by 200 pixels suitable to be processed by DL and ML models. In other words, the destitcher divides the 4K frame into several tiles, each having a resolution of no more than 200×200 pixels. As an example and not by way of limitation, the destitching system 420 may convert a 360-degree video in EQR format into cubemap face images. As another example, the destitching system 420 may convert a cubemap face image into square image tiles of smaller size than the cubemap face image. As another example, the destitching system 420 may convert a 360-degree video in EQR format into square image tiles with lower resolution. As another example, the destitching system 420 may firstly convert the input EQR frames to a cubemap format and then generate a sequence of image tiles for each cubemap face. In particular embodiments, each destitched image tiles may overlap with one or more adjacent image tiles. In particular embodiments, the input frames may be destitched on a variety of scales to accommodate objects with different size. For example, a portion of an input frame that includes a lot of relatively small detail may be destitched into relatively smaller image tiles so that each small object may be more easily detected. For portions of an input frame that include relatively large objects (e.g., a truck that appears to be relatively close to the viewer), those portions may be destitched into one or more relative larger image tiles to avoid breaking the large object into many small image tiles. In particular embodiments, destitched image tiles may have different sizes and/or fields of view. For example, a single frame may be destitched into several tiles, some of which have 90, 60, 45, 40, 30, 20, or 10 degree FOV.

In particular embodiments, the system 400 may include a region detection system 422. In particular embodiments, the region detection system 422 may receive the input frames 412 and detect regions corresponding to one or more objects in the input frames 412. For example, the region detection system 422 may detect a truck which may occupy a major portion of an input frame. In particular embodiments, the region detection system 422 may receive the destitched image tiles from the destitching system 420 and detect regions corresponding to one or more objects in the image tiles. For example, the region detection system 422 may detect a person in one or more image tiles which may correspond to a small portion of a frame. In particular embodiments, the region detection system 422 may be configured to run on EQR frames (e.g., for detection of large regions), on image tiles those frames are divided into (e.g., for detection of smaller regions), or both. In particular embodiments, the region detection system 422 may produce binary masks for the detected regions of interest and perform foreground/background segmentation on the images based on detected regions. In particular embodiments, the region detection system 422 may merge regions appearing in overlapping or adjacent tiles into larger regions.

Figure 5:
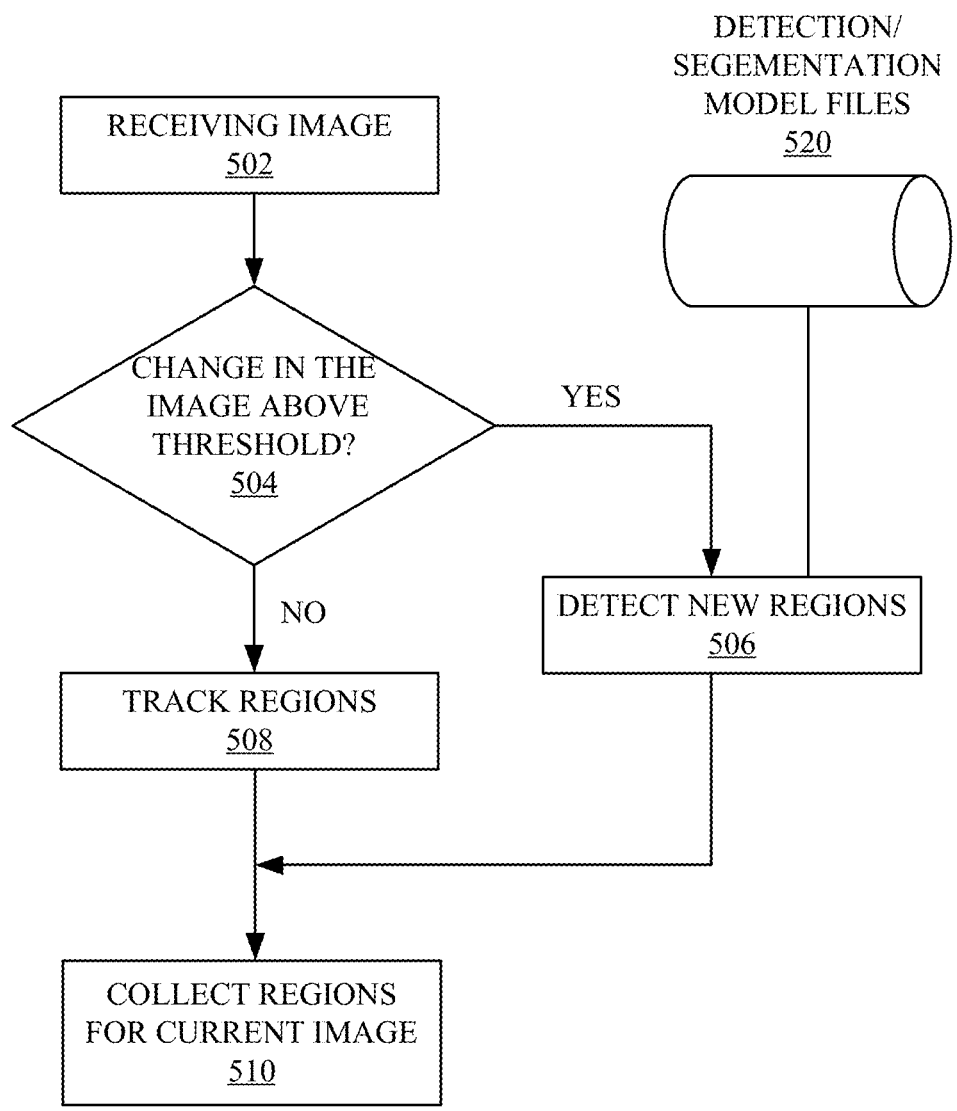
FIG. 5 illustrates an example method for tracking regions based on motion detection.

In particular embodiments, the region detection system 422 may detect and collect regions based on changes between successive images. For example, such changes may be due to motion of an object between successive images, changes in brightness, motion of the camera(s) capturing the objects, etc. FIG. 5 illustrates an example method 500 for tracking regions based on motion detection. In step 502, the region detection system 422 may receive input images (e.g., full EQR frame, cubemap faces, image tiles) from the pipeline inputs 410 and the destitching system 420. In step 504, the region detection system 422 may detect and compare the change in the current image with a preceding image. In particular embodiments, the region detection system 422 may compare a first image title with a second image tile corresponding to the first image tile in a preceding or previous frame. In other words, the first and second image tile represent the same relative portion of an image taken at different times. In particular embodiments, the region detection system 422 may compare the change in a first cubemap face image with a second cubemap face image corresponding to the first cubemap face image in a preceding or previous frame. In step 506, when a detected change is above a threshold, the region detection system 422 may detect new regions in the image using the detection and segmentation model files 520. In step 508, when the change in the image is not above the threshold, the region detection system 422 may identify regions by using previously obtained region identification information and then track the regions in the image to determine the location of the regions after the change.

In particular embodiments, a change between images may be caused by motion of one or more objects in the image. The region detection system 422 may determine the new location of the regions based on the optical flow or features points of the images. In step 510, the region detection system may collect regions for the image which may be an EQR frame, a cubemap face, or an image tile. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for detecting and tracking regions including the particular steps of the method of FIG. 5, this disclosure contemplates any suitable method for detecting and tracking regions including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

VA/AR system relies on complex computer vision techniques with complex models for creating the immersive experience for users. The complex computer vision techniques and models normally require tremendous computing power which causes serious technical problem in some situations (e.g., over-heating, large power consumption, lack of computing resources). Particular embodiments of the system provide a technical solution to this problem by reducing the computation in VR/AR system using the processing pipeline illustrated in FIG. 5 and discussed more fully herein.

In particular embodiments, the system 400 may use key frame detection to reduce the computation of the annotation pipeline. In particular embodiments, the system 400 may only perform object detection and object refinement on key frames and may not perform object detection and object refinement for non-key frames, thereby resulting in a significant computation reduction. The pipeline output for key frames may include annotations constructed based on the object detection and refinement results. The pipeline output for non-key frames may include annotations and objects masks that are constructed based on the preceding key frame. Non-key frames may contain one or more changes relative to a preceding frame, but those changes are less than a threshold, and thus information from the previous frame can be used in the current frame. For non-key frames, the system may use previously generated object masks but determine new mask locations in the non-key frames based on motion vectors of one or more objects determined by a motion estimator. In particular embodiments, within a key frame, the system 400 may only perform object detection and object refinement on image tiles including the a change that is greater than a threshold, and may not perform object detection and object refinement on images tiles which only have changes less than the threshold. In other words, the key frame detection and subsequent processing described herein may be performed on a tile-by-tile basis rather than on a frame-by-frame basis, thereby resulting in further computation reduction.

In particular embodiments, the system 400 may include a key frame detection system 424. In particular embodiments, the key frame detection system may process the regions in frame to determine whether the frame is a key frame. A frame may be identified as a key frame when the difference between the frame being analyzed and a preceding or previous frame is greater than a threshold. As an example and not by way of limitation, when the number of regions in a current fame is greater than the number of regions in a preceding frame, the current frame may be identified as a key frame. As another example and not by way of limitation, when the locations of regions in the current frame is different from those of a preceding frame and the difference is greater than a threshold, the current frame may be identified as a key frame. As another example and not by way of limitation, each time the system 400 is reset or restarted (e.g., each time a system 400 analyzes a frame for an image that has not been analyzed before), the initial frame received by the system 400 may always be identified as a key frame. As another example and not by way of limitation, the current frame may be identified as a key frame when the lighting conditions change and the change in the current frame is greater than a threshold with respect to a preceding or previous frame.

In particular embodiments, the system 400 may determine whether a key frame exists for the one or more frames received by the system 400. In response to a determination that a key frame does not exist for the one or more frames, the system 400 may identify the one or more frames as a key frame. In particular embodiments, the system 400 may compare a current frame (i.e., the frame being analyzed) with a preceding frame or a previous frame and identify the current frame as a key frame when the current frame has a change with respect to the preceding frame and the change that is greater than a threshold. In particular embodiments, in response to a determination that a key frame exists for the one or more frames, the system 400 may compare each image tile to a corresponding second image tile from a previously accessed frame of the media content and detect a change within at least one image tile relative to its corresponding second image tile from the previously accessed frame. In particular embodiments, the change between the frame in question and a preceding or previous frame may be caused by a motion/movement of an object. In particular embodiments, the system 400 may detect the motion of the objects and compare the motion to a threshold. When the motion is greater than the threshold, the system may automatically identify the object using one or more object detectors (i.e., object classifiers) and identify the frames containing the motion as a key frame. When the motion is less than the threshold, the system 400 may automatically identify the object by accessing from the previous frames an identification of the object, metadata associated with the object, annotations associated with the objects, and masks associated with the objects. The system may automatically determine an annotation for the object based on the accessed identification, metadata, annotations, and mask from previous frames.

In particular embodiments, the system 400 may determine the intersection of the bounding boxes of multiple objects to determine the motion of the objects. For example, when two objects have their bounding boxes 100% overlapped, the system may determine there is no change or motion. As another example, when two objects have their bounding boxes 90% overlapped, the system may determine that there is a motion of the object but the difference or change caused by the motion is less than the threshold, and therefore, the frame is non-key frame. Then, the system may use the identification, classification, and annotations for that object used for the previous frame to classify the object. As another example, when two objects have their bounding boxes 50% overlapped, the system may determine that there is motion of the object and the difference caused by the motion is greater than the threshold, and therefore, the frame is a key frame. The system may then perform new object detection, classification, and/or annotation to ensure that the object is accurately identified and annotated.

In particular embodiments, the system 400 may include an object detection system 426 including a number of object detectors (e.g., 426A, 426N) and an object refinement system 430 including a number of specified object models (e.g., 430A 430B). In particular embodiments, the system 400 may run object detection and refinement on each key frame and may not run object detection and refinement on non-key frames. In particular embodiments, the system 400 may run object detection and refinement on each image tile that has a change greater than a threshold and not run object detection and refinement on image tiles having no change or changes that are less than a threshold. In particular embodiments, each object detector (e.g., 426A, 426N) may run on each of the detected regions in the frame. Each detector may generate a set of labelled masks for the detected object with confidence values/scores/metrics. As an example and not by way of limitation, the object detectors (e.g., DL network or ML network) may identify a vehicle in the frame with a confidence score of 80% as a bus, 16% as a truck, and 2% as a train, and the object detector may then identify the vehicle as a bus. In particular embodiments, the object detectors may generate a bounding box for each of the detected objects and add the bounding box to the detected object together with the corresponding confidence scores. The bounding box may be rectangular or non-rectangular (e.g., the shape of the object). In particular embodiments, the object detectors may generate labels for the masks associated with corresponding objects. In particular embodiments, the system may segment the frame into different regions corresponding to the detected objects and each region may be classified as associated with or part of the detected object.

In particular embodiments, the system 400 may include an object refinement system 430. In particular embodiments, the labelled regions in a key frame may processed by one or more models further categorizing an identified class of objects. As an example, when the object detector labels a region as containing a person, the region labeled as "person" may be processed by models that are specific to people to estimate age, gender, emotion, pose, etc. As another example and not by way of limitation, the key frame may include a region identified as a building. The region including the building may be processed by a landmark classification model that identifies popular buildings and locations. The additional information provided by object refinement may be added to the label of that region. Collectively, the set of regions and their labels may be included as the metadata for the frame.

Figure 6A:
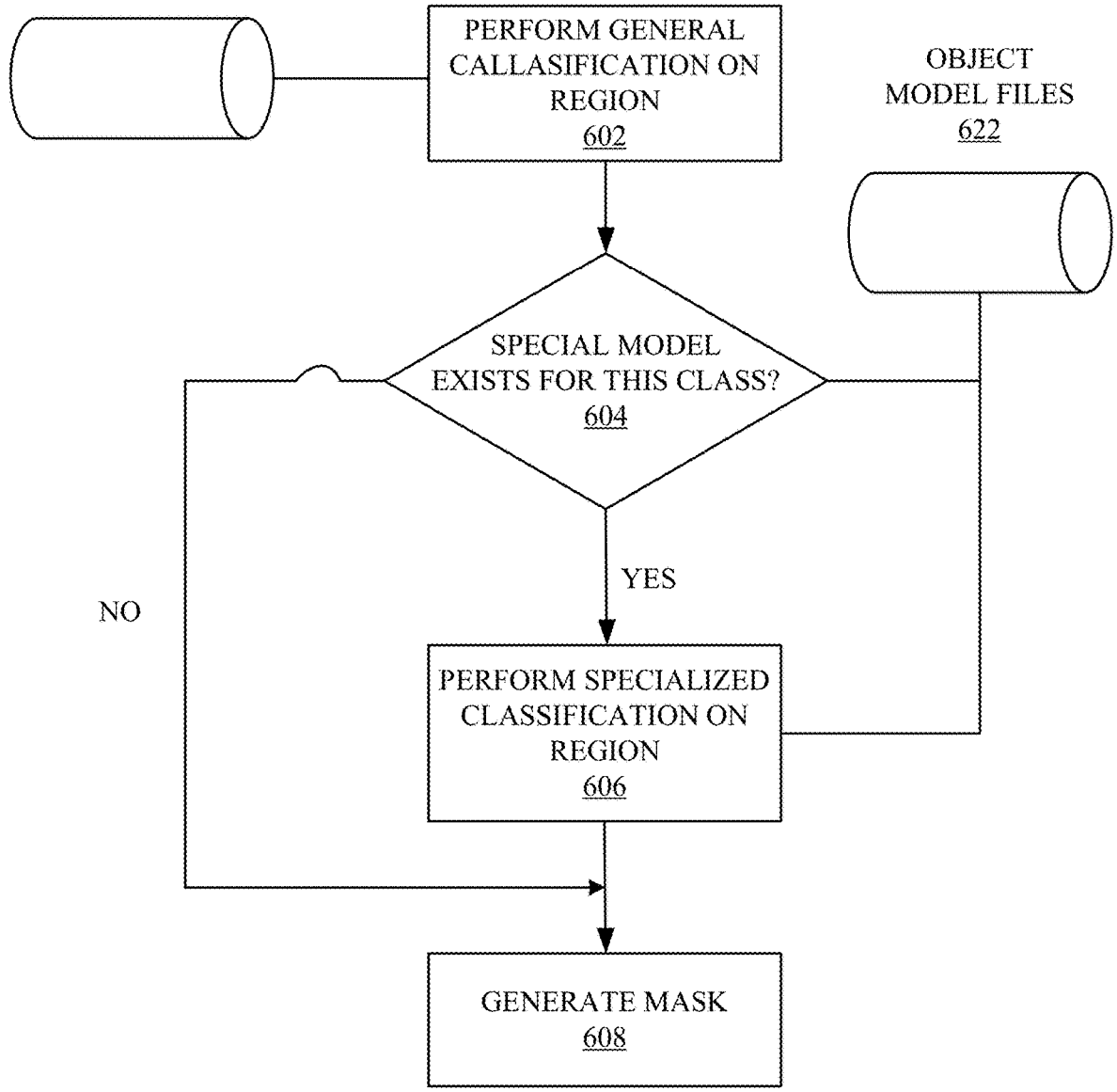
FIG. 6A illustrates an example method for object detection and refinement.

FIG. 6A illustrates an example method 600 for object detection and refinement. In particular embodiments, the object detection and refinement may be performed on one or more regions of a full frame, a cubemap face, or an image tile. In step 602, the system may access the general classification model files 620 and perform general classification on the regions of the image. The system may identify an object of a particular category, for example, a building, a person, or a vehicle. In step 604, the system may determine whether there is a special model for that particular category. In step 606, when the special model for that particular category exists, the system may access the special object model files 622 and perform a specialized classification on that region for object refinement. When the special model for that particular category does not exist, the system may skip the object refinement and directly move to step 608. In step 608, the system may generate masks and annotations for the detected objects based on the object detection or/and object refinement results. Although this disclosure describes and illustrates particular steps of the method of FIG. 6A as occurring in a particular order, this disclosure contemplates any suitable steps of the method of FIG. 6A occurring in any suitable order. Moreover, although this disclosure describes and illustrates an example method for object detection and refinement including the particular steps of the method of FIG. 6A, this disclosure contemplates any suitable method for object detection and refinement including any suitable steps, which may include all, some, or none of the steps of the method of FIG. 6A, where appropriate. Furthermore, although this disclosure describes and illustrates particular components, devices, or systems carrying out particular steps of the method of FIG. 6A, this disclosure contemplates any suitable combination of any suitable components, devices, or systems carrying out any suitable steps of the method of FIG. 6A.

Figure 6B:
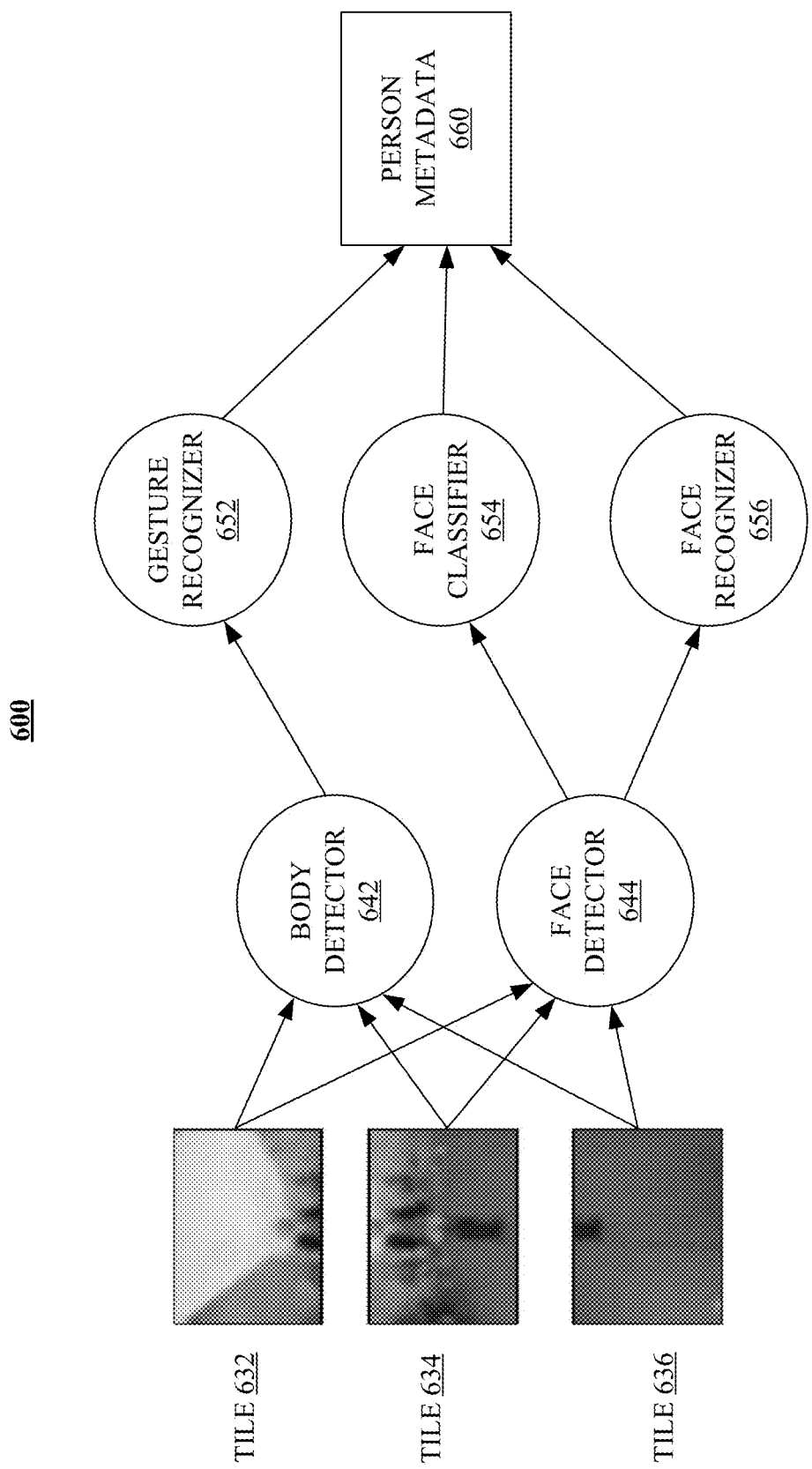
FIG. 6B illustrates an example implementation for object detection and refinement

FIG. 6B illustrates an example implementation for object detection and refinement. As an example and not by way of limitation, the image tiles 632, 634, and 636 may be fed to a body detector 642 and a face detector 644, respectively. When the body detector 642 detects a body in one or more image tiles, the detected results and the corresponding image tiles may be sent to a gesture recognizer 652 for recognizing one or more gestures made by the detected body. When the face detector 644 detects a face in one or more images tiles, the detected results and the corresponding image tiles may be sent to a face classifier 654 and a face recognizer 656, respectively. The face classifier 654 may determine a number of characteristics of the detected face (e.g., age, gender, emotional state, expression, etc.) and classify the detected face into different categories based on the determined characteristics of the detected face. The face recognizer 656 may recognize the person (e.g., name) to whom the detected face belongs to. In particular embodiments, the results of the gesture recognizer 652, the face classifier 654, and the face recognizer 656 may be aggregated to construct a personal metadata 660 for the detected person. The system may include an aggregator which may aggregate the information based on a number of factors related to the image tiles including, for example, but not limited to, the overlapping regions of the adjacent image tiles, the relation of the image tiles, or rules from knowledge base. As an example and not by way of limitation, the aggregator may determine that the faces detected from tiles 632 and 634 belong to the same person because the tile 632 is adjacent to tile 634 and the faces from the two tiles have some similarity. As an example and not by way of limitation, the aggregator may associate the foot detected in image tile 636 to the body detected in image tile 634 based on the relative position of the two tiles and the object detected in those tiles. As an example and not by way of limitation, the aggregator may associate wheels with a car based on their relative positions and the knowledge that a car has wheels.

In particular embodiments, the system 400 may include a mask construction system 428 for constructing masks for the detected objects in the frame. For the object detected in a key frame, the object detection results may be sent to the mask construction system 428 to construct masks for the detected objects in the key frame. The object refinement results may be used to generate frame metadata 464 (e.g., JSON) and to construct annotations for the corresponding objects. The mask for a particular object may be constructed based on the contour of the object. When a mask is added to the associated object, the mask may have the same or similar shape as the object and surround the associated object. The masked object may show higher saturation and higher brightness than the rest area of the image (e.g., FIGS. 3B-3D). For non-key frames, the mask construction system 428 may use the formerly generated masks of the objects constructed from former frames to construct the masks. When the objects in non-key frame have motions and the motions are less than the threshold to allow the frame to be identified as key frame, the mask construction system 428 may use the formerly generated mask and a motion vector to determine new locations for the masks of the moved objects. In particular embodiments, for key frames, the system may generate the annotations for the objects in the frame based on the metadata extracted from the object detection and refinement results. For the non-key frames, the annotations may be constructed based on the formerly generated metadata associated with the objects in one or more previous frames.

Figure 7:
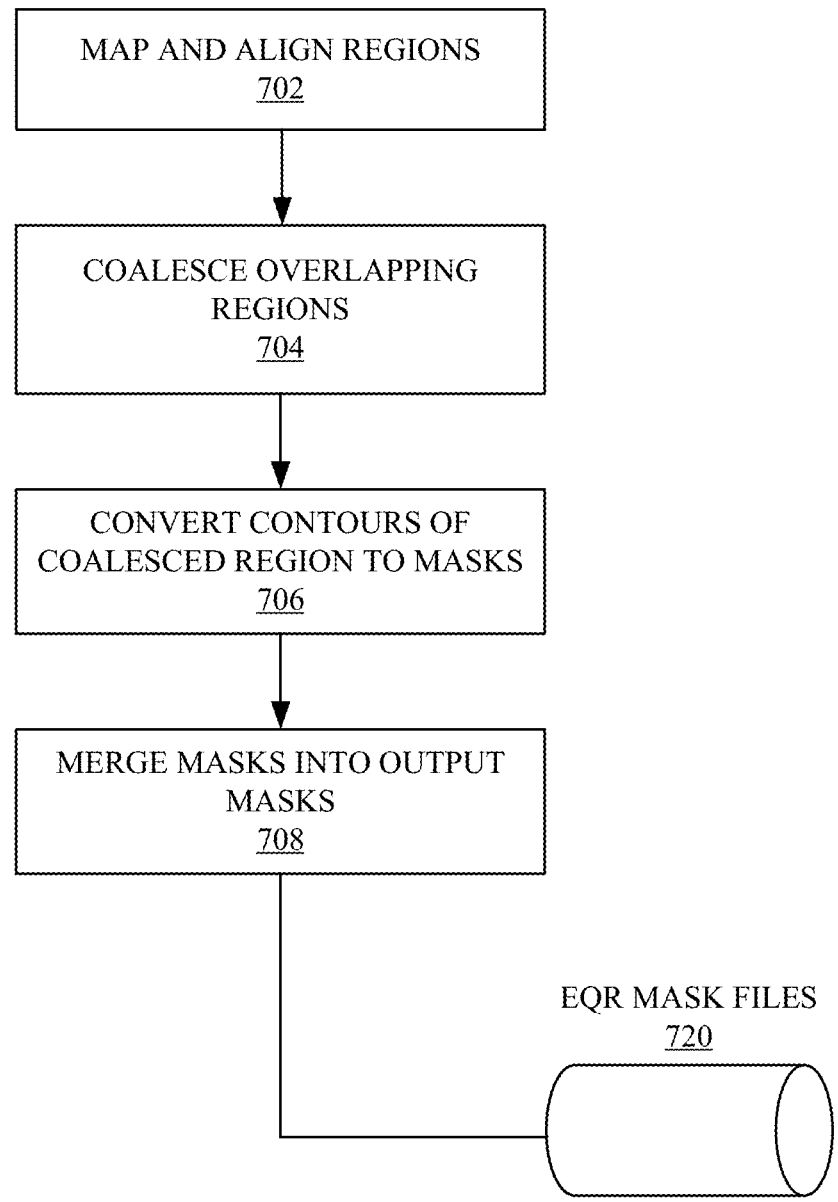
FIG. 7 illustrates an example method for mask construction.

FIG. 7 illustrates an example method 700 for mask construction. In step 702, the system may map and align regions in the frames based on the regions' shape and relationship with each other. In step 704, the system may coalesce overlapping regions in the frames. In step 706, the system may convert contours of the coalesced regions to one or more masks. In step 708, the system may merge the one or more masks into an output mask and save the generated output mask in, for example, EQR mask files 720. In particular embodiments, masks may be further refined by: 1) merging overlapping masks if they have matching labels with confidence values above a specified threshold, 2) removing masks with labels of low confidence (e.g., below a specified threshold), or 3) optionally removing masks that appear in only a small number of frames (e.g., flicker). After the mask have been constructed, the masks may be projected back into EQR coordinates so they can be registered with the original frame and associated with the corresponding objects. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for mask construction including the particular steps of the method of FIG. 7, this disclosure contemplates any suitable method for mask construction including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, the system 400 may include a depth map generation system 440. In particular embodiments, stereoscopic 360-degree content or stereoscopic non-360-degree content may be passed to the depth map generation system 440 which may determine depth information for the objects in the scene using the image disparity of the left and right images of the stereoscopic frame pairs. In particular embodiments, the depth map generation and region detection may be run on re-projected image tiles and entire EQR frames together. The depth map generation system may generate a depth map, which may be registered with the input content like the object masks and annotations. In particular embodiments, the system 400 may automatically associate annotations with the corresponding objects based at least in part on information from the depth map. For example, annotations may correspond to objects based on their depth (e.g., an annotation corresponding to an object in the background may appear behind or farther away than an annotation corresponding to an object in the foreground).

In particular embodiments, the system 400 may include a spatial understanding system 450. In particular embodiments, the spatial understanding system 450 may extract information about the cameras used to capture an image, for example, location, orientation, and pose of the camera, and information about real world geometry, for example, locations of floors and walls, shape of objects, relative position of objects, size of objects, surface angle, etc. The inputs 416 to the spatial understanding system 450 may include the RGB frames along with IMU sensor data. The outputs of the spatial understanding system 400 may include camera pose data, object geometry data (e.g., shapes and types of detected objects), and mapping data (e.g., coordinate systems used for the pose and geometry data).

In particular embodiments, in addition to 360-degree RGB video input, the system may be configured to process 180-degree video, traditional video (e.g., video taken by a smartphone camera or other video camera with fixed or varying field-of-view), video with a depth channel (e.g., 360-degree video, 180-degree video, traditional video), or stereoscopic video (e.g., 360-degree video, 180-degree video, traditional video). In particular embodiments, the system 400 may project a virtual grid composed of dots and lines on a surface for spatial understanding of the surface, as illustrated in FIG. 3E. In particular embodiments, the system 400 may associate the annotations to corresponding objects based on the mapping information (e.g., size, shape, position) of those objects.

In particular embodiments, the system 400 may access one or more frames of media content and each frame may correspond to at least part of an image. The system may automatically detect at least one object in at least one of the one or more frames and automatically identify the at least one object. For each of the identified objects, the system may automatically determine an annotation corresponding to that object. For each annotation, the system may automatically associate that annotation for display with its corresponding object. In particular embodiments, the image may include a 360-degree image or an image from a pair of stereoscopic images. In particular embodiments, the annotations may be determined based on one or more metadata associated with that annotation's corresponding object. In particular embodiments, the media content may be displayed on a head-mounted display (HMD) to a user. In particular embodiments, the one or more frames of the media content may be captured by and transmitted from one or more cameras which are located at a remote location to the HMD. In particular embodiments, the media content may be captured by one or more cameras associated with the HMD.

In some embodiments, the system 400 may have various alternative internal connections of the pipeline. As an example, the system may pass the destitched image tiles or cubemap faces to the spatial understanding system 450 to analyze the spatial information of the images. As another example, outputs from spatial understanding system 450 may be passed to object detection and refinement system for object classification. As another example, stereoscopic frame pairs may be passed to object detection system 426 for further depth estimation. As another example, the results from object detection 426 and object refinement 430 may be passed to spatial understanding system 450 for scene understanding.

In particular embodiments, the system 400 may have the whole pipeline fully running on a device. In particular embodiments, the system 400 may have the pipeline fully running on a cloud. In particular embodiments, the system 400 may have the pipeline running in hybrid model, partially on-device and partially on-cloud. In particular embodiments, the system 400 may run offline with pre-recorded inputs. In particular embodiments, the system 400 may run in online mode with live inputs. In particular embodiments, the system 400 may have recorded content allowing a user to interact with the content. In particular embodiments, the system 400 may be adaptive depending on processing/interaction demands. As an example and not by way of limitation, the system 400 may have some stages of the pipeline run less frequently and some stage of the pipeline run more frequently depending the processing and interaction demands. Although this disclosure describes an AR system having particular components, this disclosure contemplates any AR system with any suitable components.

In particular embodiments, the system may determine and use global motion estimation to further reduce the computation associated with updating annotations for objects in successive image frames. In particular embodiments, the system may use a relative lower frame rate when the scene of the media content is mostly static (e.g., no global motion, no object motion in a frame). The system may use a higher frame rate when there is either global motion or object motion, thereby reducing the computation and data flow of the system.

Figure 8A:
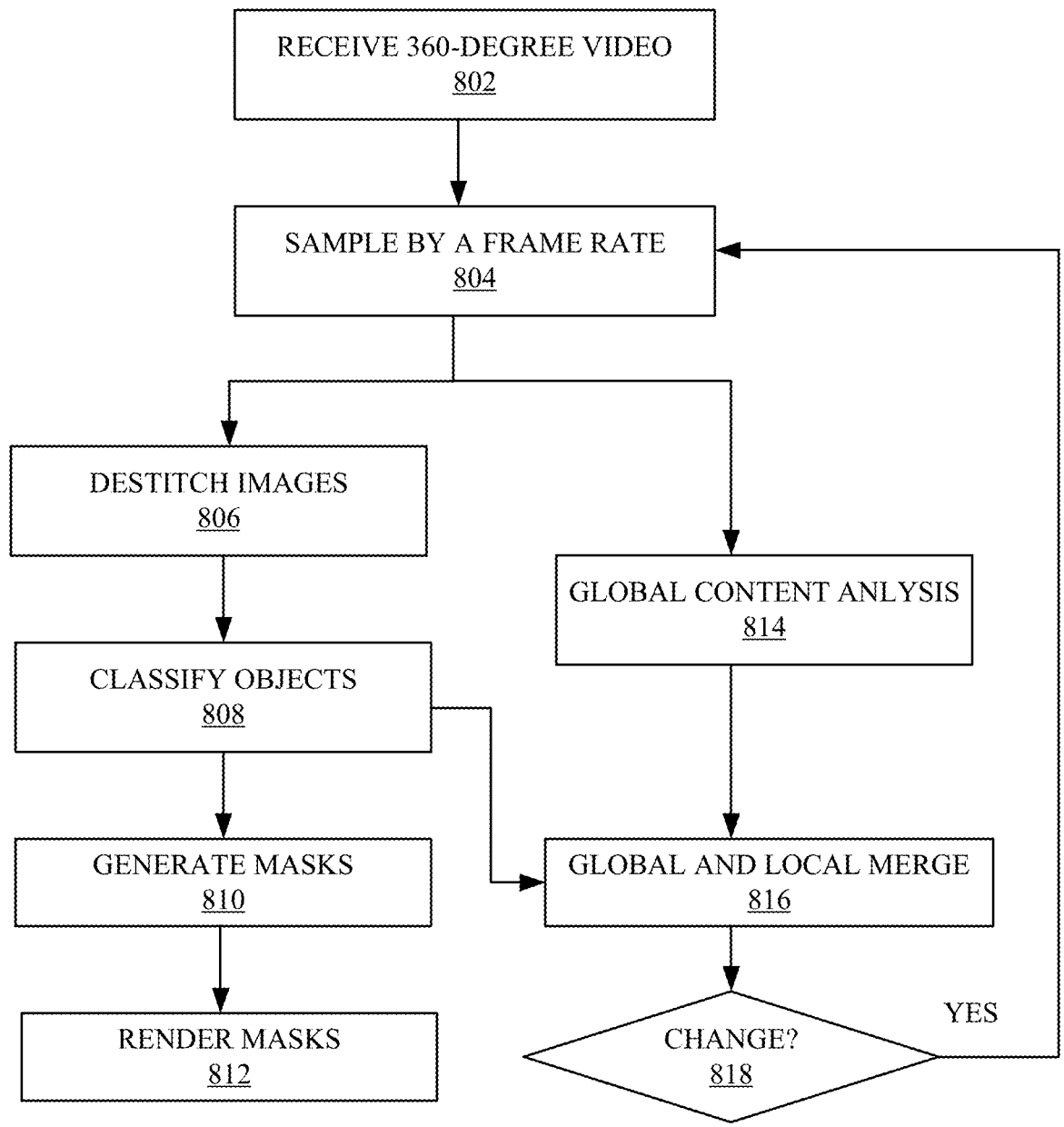
FIG. 8A illustrates an example method for motion-aware and content-aware vision intelligence for the system.
Figure 8B:
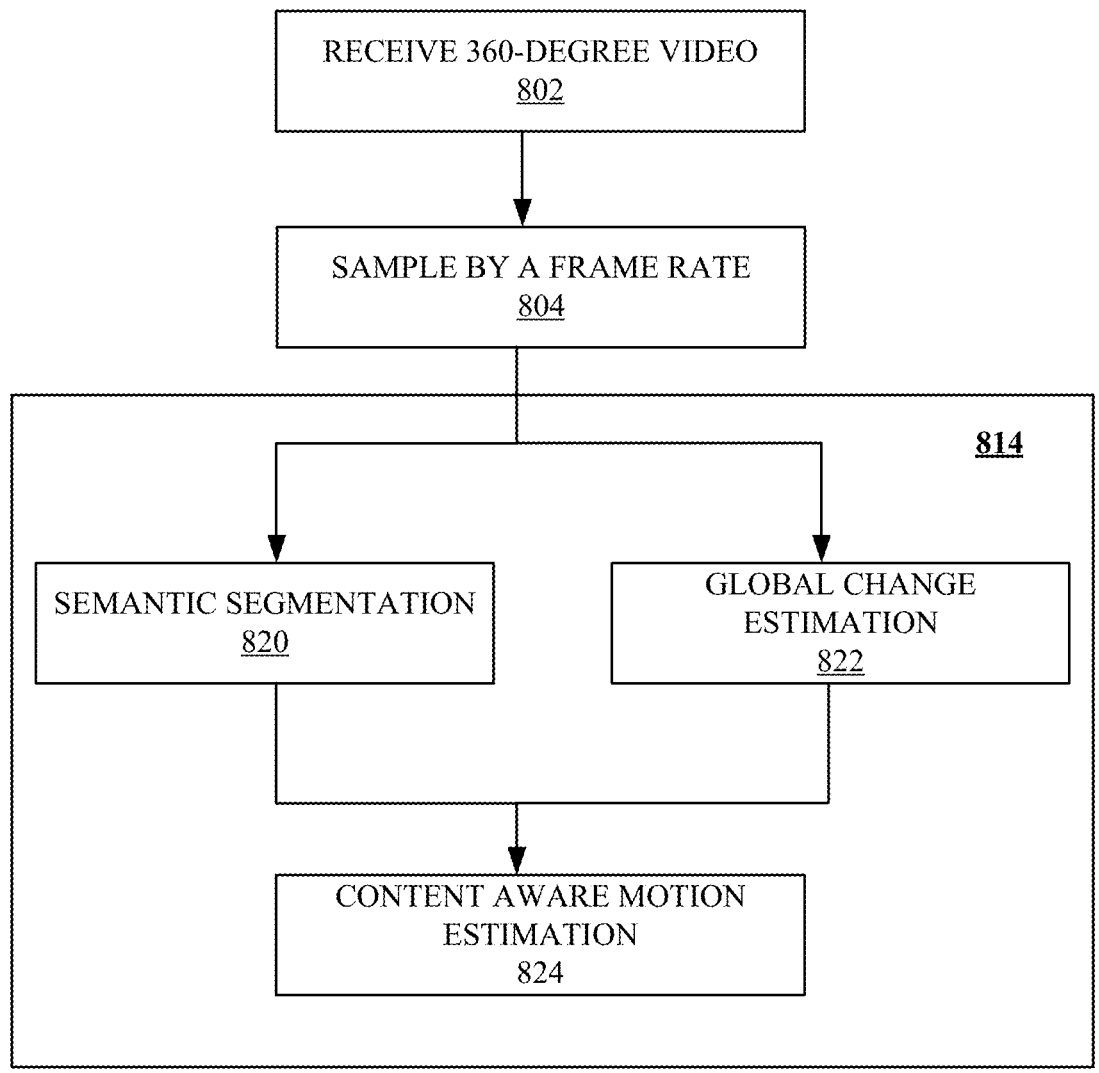
FIG. 8B illustrates an example method for global change estimation.

FIG. 8A illustrates an example method 800A for motion-aware and content-aware vision intelligence for the system. In step 802, the system may receive images, such as 360-degree video, as an input. In step 804, the system may sample the input video using a sampling frame rate. In step 806, the system may destitch the input frames into image tiles of a suitable shape (e.g., square image tiles), with each tile having a lower resolution than its input frame. In step 808, the system may classify objects in the image tiles. For example, the system may use object detection and object refinement if the sample is a key frame, and the system may use object information in a previous frame if the frame is not a key frame. In step 810, the system may generate masks and annotation for the detected objects in the image tiles. In step 812, the system may render the generated masks and annotations in the video. In step 814, the system may take the sampled video and perform global content analysis on the sampled video. In particular embodiments, the system may use the method as illustrated in FIG. 8B to perform the global analysis on the sampled video. In step 816, the system may merge the global content analysis results with the local object classification results from step 808. In particular embodiments, the system may further perform global and local content refinement on after the global and local content merge. In step 818, the system may determine if there is a global change (e.g., motion) in the frames of the video and if the objects in the frames are moving. When the system determines that there is a global change in the frames of the video (e.g., the cameras are moving) or there is local change for the objects (e.g., object motion, new object entry) within the frames, the system may determine a new sampling frame rate and adjust the system to sample the input video using the new sampling frame rate in step 804, with higher frame rates used when more change is detected. Although this disclosure describes and illustrates particular steps of the method of FIG. 8A as occurring in a particular order, this disclosure contemplates any suitable steps of the method of FIG. 8A occurring in any suitable order. Moreover, although this disclosure describes and illustrates an example method for motion-aware and content-aware analysis including the particular steps of the method of FIG. 8A, this disclosure contemplates any suitable method for motion-aware and content-aware analysis including any suitable steps, which may include all, some, or none of the steps of the method of FIG. 8A, where appropriate. Furthermore, although this disclosure describes and illustrates particular components, devices, or systems carrying out particular steps of the method of FIG. 8A, this disclosure contemplates any suitable combination of any suitable components, devices, or systems carrying out any suitable steps of the method of FIG. 8A.

As an example and not by way of limitation, the system may determine that there is no global motion of the scene nor local object motion in the frames and the system may sample the input video using a relative lower sampling frame rate. As another example and not by way of limitation, the system may determine that there is a global motion of the scene but there is no object motion in the frames based on the content of scene (e.g., the objects in the scene are all buildings which cannot move), and the system may determine a medium sampling frame rate. As another example and not by way of limitation, the system may determine that there is a global motion of the scene (e.g., caused by moving cameras) and that there are object-specific motions within the frames (e.g., a moving car, a walking person, a running pet), and the system may determine a relative higher sampling frame rate to sample the input video. In particular embodiments, the sampling frame rate may be determined based on parameters related to a motion vector (e.g., speed, direction) of the global motion or/and parameters relative to motion vectors (e.g., speed, direction) of one or more moving objects in the frames.

FIG. 8B illustrates an example method 800B for global change estimation. As illustrated in FIG. 8B, global estimation may occur immediately after receiving video samples, rather than later in the processing flow as illustrated in FIG. 8A. In step 802, the system may receive the 360-degree video as an input. In step 804, the system may sample the input video using a sampling frame rate. In step 820, the system may perform semantic segmentation on the frames of the sampled video to generate global semantic boundaries for the frames of the video. In particular embodiments, the system may access global segmentation models to perform the global semantic segmentation. In step 822, which may occur in parallel with step 820, the system may perform global change estimation. In particular embodiments, the global change estimation may include global motion estimation to generate global motion vectors. In step 824, the system may perform content-aware and motion-aware estimation based on the global semantic boundaries generated in step 820 and the global motion vectors generated in step 822. Although this disclosure describes and illustrates particular steps of the method of FIG. 8B as occurring in a particular order, this disclosure contemplates any suitable steps of the method of FIG. 8B occurring in any suitable order. Moreover, although this disclosure describes and illustrates an example method for global change and content analysis including the particular steps of the method of FIG. 8B, this disclosure contemplates any suitable method for global change and content analysis including any suitable steps, which may include all, some, or none of the steps of the method of FIG. 8B, where appropriate. Furthermore, although this disclosure describes and illustrates particular components, devices, or systems carrying out particular steps of the method of FIG. 8B, this disclosure contemplates any suitable combination of any suitable components, devices, or systems carrying out any suitable steps of the method of FIG. 8B.

In particular embodiments, the system may include a camera that captures 360-degree video from a remote location. For example, the remote location may be a shopping mall, and the video may be footage of a user walking down a row of stores that have different products on display. The video may be a walkthrough produced by walking through the mall. The mall may present this video as promotional content on a website for VR content. Through a separate offline process, metadata may be generated for the recorded video. The system may generate metadata based on availability of system resources (e.g., the system may generate metadata late at night when the servers are less busy). This pre-generated metadata may be stored and associated with the recorded video. The pre-generated metadata may include basic information about scenes or objects of interests shown in the recorded content or OCR of the images to identify the names and locations. In the example where there are various products shown throughout a mall, the pre-generated metadata may specify basic categories for those products (e.g., cell phone, television, speakers, washing machine, etc.) as well as store names, location names, etc. Some or all of the metadata may be presented in the video as an annotation corresponding to its object. In particular embodiments, the AR system may allow users to interact with the AR media content based on annotations on a pre-recorded video, a live 360-degree video, or a 360-degree 3D video. Particular embodiments may allow users or automated agents to share, create, and modify interactive content on the 360-degree video. In particular embodiments, both current and subsequent users may interact with related metadata to enhance 360-degree videos, either synchronously (co-presence) or asynchronously (co-location).

Figure 9:
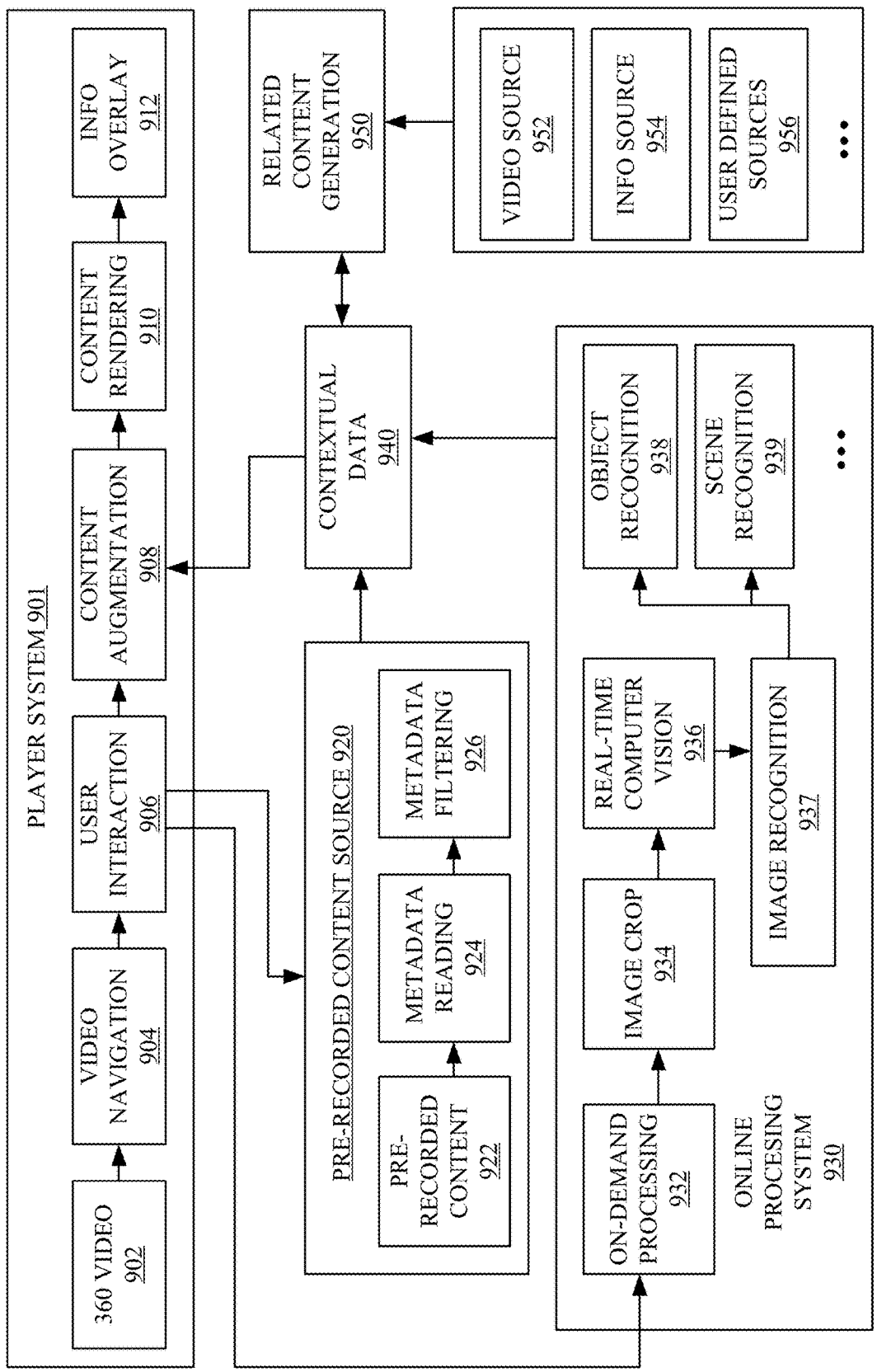
FIG. 9 illustrates an example system for users to view and interact with AR media content.

FIG. 9 illustrates an example system for users to view and interact with AR media content. In particular embodiments, users may interact with the AR media content through a player system 901. The player system 901 may be a head-mounted display (HMD) device, such as a AR headset or VR headset. The HMD may be worn by a user and may be used by the user to view and interact with the pre-recorded video, the live video, or the augmented view of the user's surroundings (which may be presented as live video).

Pre-recorded video may be stored on the HMD, or streamed to the HMD through a content server (e.g., Samsung content server, YouTube, etc.). While watching the video, a user may navigate and interact with the content by using various input controls (e.g., handheld, head rotation, etc.). While displaying the video on the HMD, the system may detect user interaction with a segment of interest in the video. The segment of interest may be a corresponding portion of the 360-degree video that the user is viewing and interacting with, which may be determined based on the detected head pose of the user (e.g., using sensors in the smartphone and/or HMD) and the corresponding playback time of the video. The segment of interest and corresponding user interaction data may indicate details about the scene and the user's interactions with the scene (e.g., object selections, views, etc.). For example, the user interaction data may indicate that the user interacted with a particular object corresponding to a washing machine.

In particular embodiments, the system 901 may determine user interaction with the scene of the media content based on outputs of one or more sensors of the HMD worn by the user. In particular embodiments, the interaction of the user with the media content may include, for example, but are not limited to, a voice command, a gesture, a motion of a body part, a state of a body part, a direction of a body part, a selection through a controller, or an indication of interest on a portion of the media content. In particular embodiments, the system 901 may determine the annotations and masks for one or more objects in the media content based on the user interaction with the media content. In particular embodiments, the annotations of the objects may be used to indicate the possible interaction with these objects to guide user's interaction with the objects. In particular embodiments, the annotation may be displayed all the time or only when the user is interacting with the associated objects.

The player system 901 may receive a 360-degree video 902 from one or more content sources (e.g., 920, 930), as descripted below. The player system 901 may include a video navigation system 904, which may allow the user to navigate the 360-degree video using on-screen controls or other inputs such as gestures, output from a handheld controller, and etc. The user interaction data 906 may be used to determine relevant pre-generated metadata. In particular embodiments, the determination of the pre-generated metadata may be performed on the HMD device itself when the pre-recorded video is stored on the HMD storage. In particular embodiments, the determination of the pre-generated metadata may be performed by a mobile device like a smartphone when the pre-recorded video is stored on the mobile device. In particular embodiments, the determination of the pre-generated metadata may involve sending the user interaction data to the content server and retrieving the pre-generated metadata.

In particular embodiments, the user interaction data 906 may be sent to the pre-recorded content source 920. The content source 920 may analyze the user's head pose and the user's interaction data and access the pre-generated metadata about the video at that time and place. For example, complex computer vision algorithms may be run on a server to segment areas of interest, identify objects, capture and translate text, provide geo-located information based on the location and direction of video camera, etc. The metadata reading module 924 may read the metadata from the pre-recorded content 922 and the metadata may be filtered based on user preferences and view using the metadata filtering module 926. The metadata may be sent to the contextual data module 940. The contextual augmentation 908 may render the contextual data based on, e.g., user preferences.

In particular embodiments, the head pose and user interaction data 906 may also be sent to an online processing system 930. The online processing system 930 may include an on-demand processing module 932 and image cropping module 934. The on-demand processing module 932 may process the received head pose and user interaction data. The image cropping module 934 may crop the images to the part of the image viewed by the user or the specific part of the image that includes the region the user is pointing at. The real-time computer vision module 936 may coordinate and run various image recognition algorithms 937 and object recognition algorithms 938 and 939. The on-demand metadata may be sent back to contextual data module 940 and may be filtered, rendered, and displayed by the content augmentation module 908. The on-demand metadata may provide additional information that is different from the pre-generated metadata. For example, the on-demand metadata may indicate a brand name (e.g., "Samsung") and model number of the washing machine. In contrast, the pre-generated metadata may describe basic information, such as the fact that the washing machine is white. Some functions of the online processing system may be performed by the HMD. For example, some image recognition/classification may be executed by the smartphone coupled to the VR headset. By using and leveraging the on-demand metadata, the pre-recorded video content may become more dynamic and interactive, without needing to rely purely on manually pre-generated metadata. In addition, third-party services and content may be more easily integrated into the AR experience, without having to continually modify the pre-generated metadata of pre-recorded content.

Based on the user interaction data 906, pre-generated metadata for the segment of interest in the video may be determined. As an example and not by way of limitation, the user interaction data 906 may indicate that the user is interacting with a washing machine at the mall. This data may then be used to fetch relevant pre-generated metadata, such as basic information about the object the user is interacting with. For example, the pre-generated metadata may specify: (1) the object is a washing machine, and (2) the washing machine is white. In some cases, if there is too much metadata to display, the metadata may be filtered based on a user profile or other preferences, such as information about the user's current or past interactions with the object. Afterwards, the pre-generated metadata may be provided as contextual data to the HMD, and the HMD may display a plurality of annotations based on the pre-generated metadata. For example, the HMD may present an overlay next to the washing machine that indicates "White Washing Machine." Meanwhile, the same user interaction data 906 (e.g., head pose, objects selected by user, information about segment of interest, etc.) may be sent to the online processing system for processing in order to generate or obtain on-demand metadata for the segment of interest.

In particular embodiments, the contextual data module 940 may, at the direction of the user or preference of the user, access external sources (e.g., 952, 954, 956) to get additional information about the region or object that the user is interested in. Additional information may be obtained using the on-demand metadata and, optionally, the pre-generated metadata as well from one or more external sources (e.g., websites, services, etc.). As an example, one external source may be a retail website (e.g., Amazon.com) where the washing machine can be purchased. As another example, another external source may be a website including consumer reviews for the washing machine (e.g., CNET.com). The additional content may be sent back to the HMD and overlaid on the displayed video. For example, as the user continues to view the washing machine, the overlay may include a hyperlink to the retail website where the washing machine can be purchased, as well as a corresponding price. Furthermore, the overlay may also include several customer reviews obtained from the review website.

The contextual data module 940 may pass the recognition data from the pre-recorded content source 920 (which may be offline) and the online processing system 930, as well as the user pose and image data to the related content generator 950, which may query the external sources to get more data for the selected object in the scene. The retrieved data may be processed and rendered by the contextual data module 940 and the content augmentation module 908. The data from contextual data module may be fed to the content augmentation module 908, which may adapt the imagery to be rendered visually using the rendered content to generate an information overlay on the final display of the content.

Figure 10A:
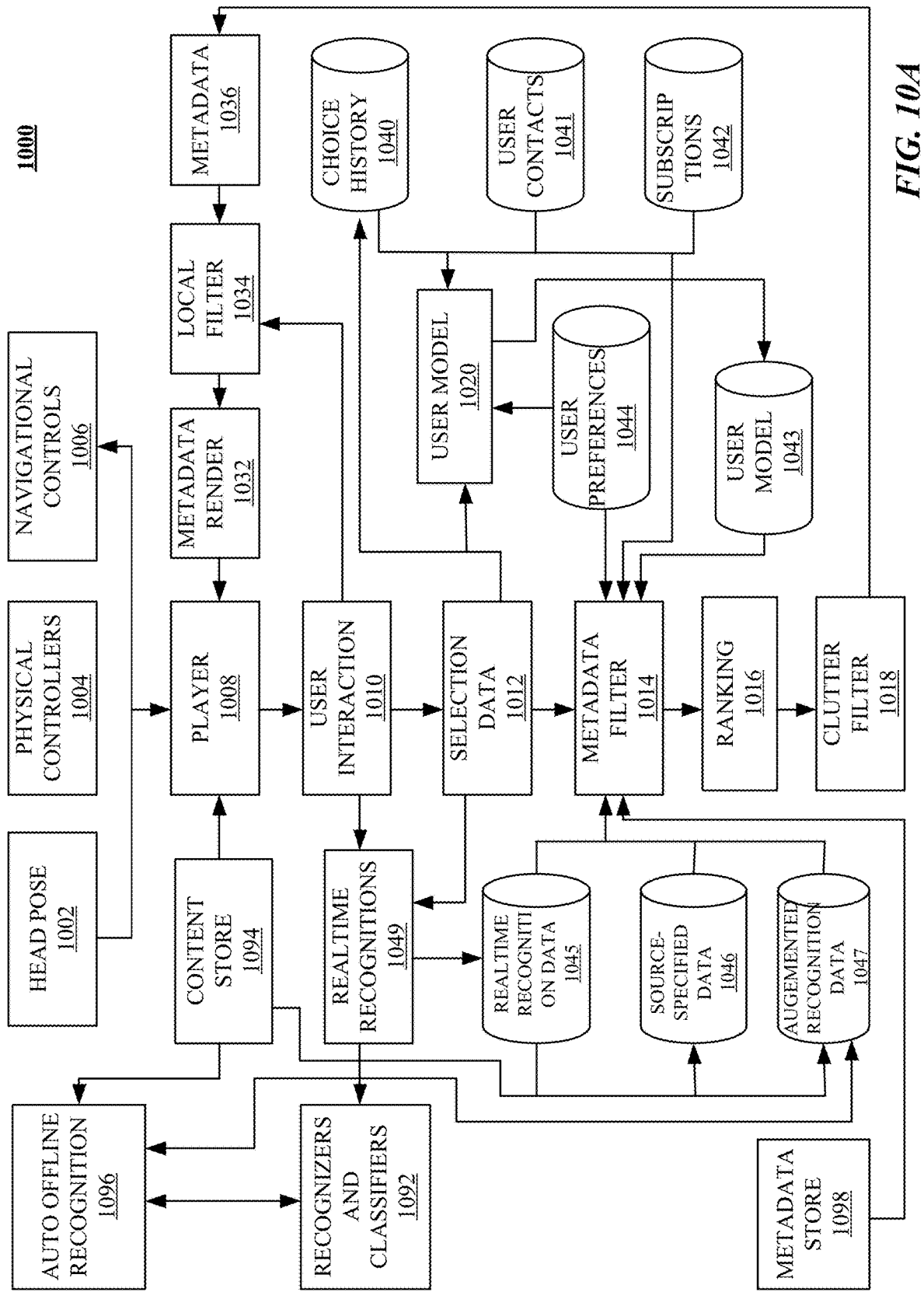
FIG. 10A illustrates an example implementation of the system for users to view and interact AR media content.

FIG. 10A illustrates an example implementation of a system for users to view and interact with AR media content. In particular embodiments, this system may be used in conjunction with a system for automatically annotating AR content, such as the example system(s) described above. In particular embodiments, the user interaction may begin with the player 1008, which may receive the head pose 1002, hardware control 1004, and software navigational control data 1006. The content may come to the player from any number of content stores (e.g., 1094). The data is processed by the user interaction system 1010 to produce the selection data 1012. The data from the augmented recognition database store 1047 may be processed by the offline processor of the automatic offline recognition 1096 and passed to the recognizers and classifiers 1092, which may be external or internal to the system. The output may be stored in the augmented recognition database store 1047. The metadata from the content may be cached in the source-specified recognition database 1046.

In some embodiments, selection data 1012 may be passed to the online real-time recognition engine 1049 which may query the recognizers and classifiers 1092 to produce the real-time recognition data. This data may be cached in the real-time recognition database 1045 and fed to the metadata filter 1014. The metadata filter 1014 may access general knowledge filters in the metadata store 1098 which may provide various types of information that is not directly tied to the video content but is relevant to the video content. The selection data module 1012 may access choice history 1040, user choices, user contacts 1041, and user subscriptions 1042, which are processed by the user modeler into a user model 1020. The user model 1020 may provide a summary of the types of content the user may like. The user selection 1012 may also contain data that overrides or changes the results of the user model 1020 in the metadata filter 1014. The metadata filter 1014 may produce a set of results which are ranked by the ranking module 1016 and are visually filtered to reduce clutter and provide the most relevant results in the user's visual context. The final metadata representation 1036 may be sent back to a local filter 1034 in the player system, which may further modify, relocate, or summarize the data based on local user preference, heuristics, and user experience (UX) considerations. The filtered data may be passed to the metadata renderer 1032 which may render the final UX for the data and overlay the annotations on the content inside the player system. Although this disclosure describes an AR player system having particular components, this disclosure contemplates an AR player system with any suitable components.

Figure 10B:
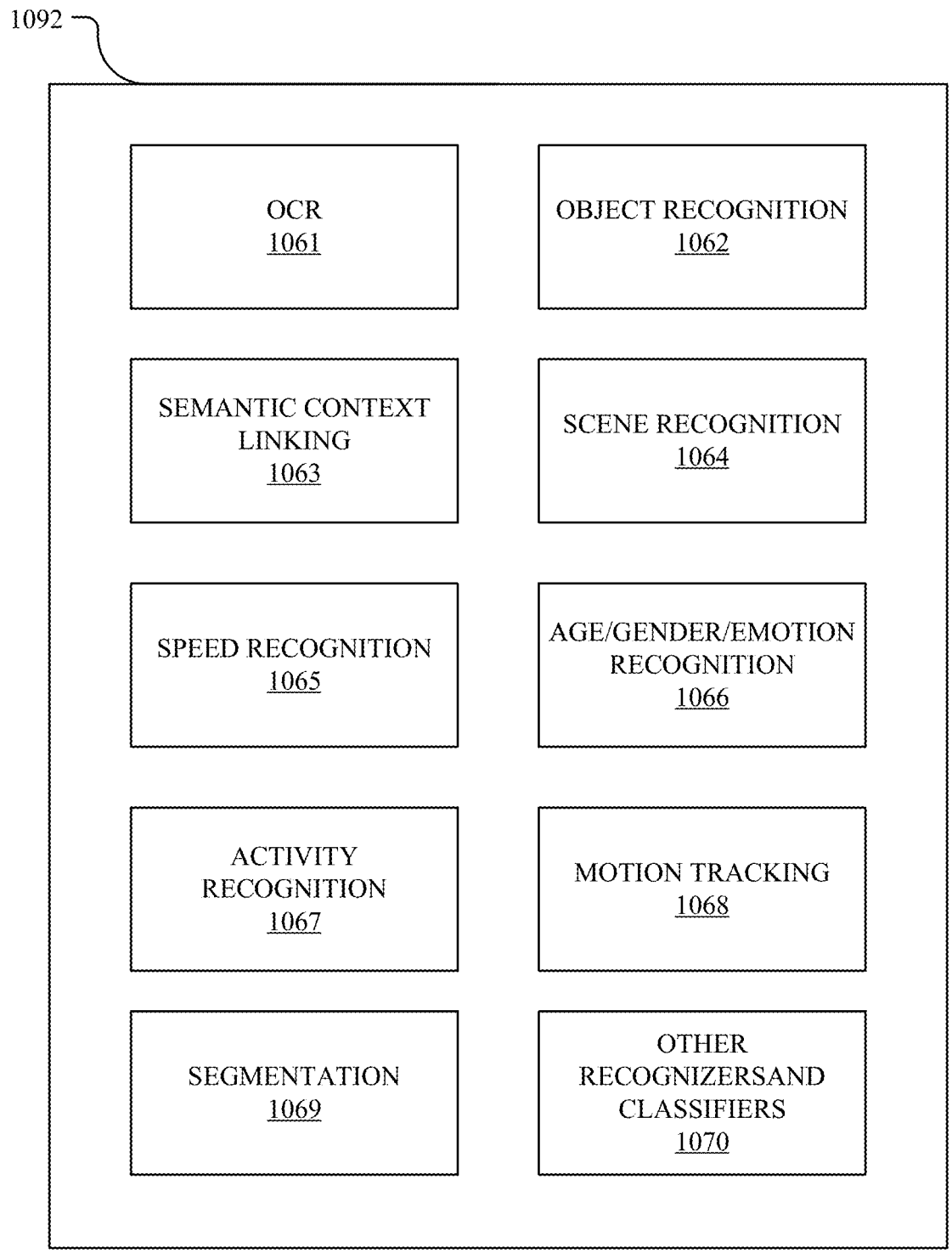
FIG. 10B illustrates an example store for recognizers and classifiers.
Figure 10C:
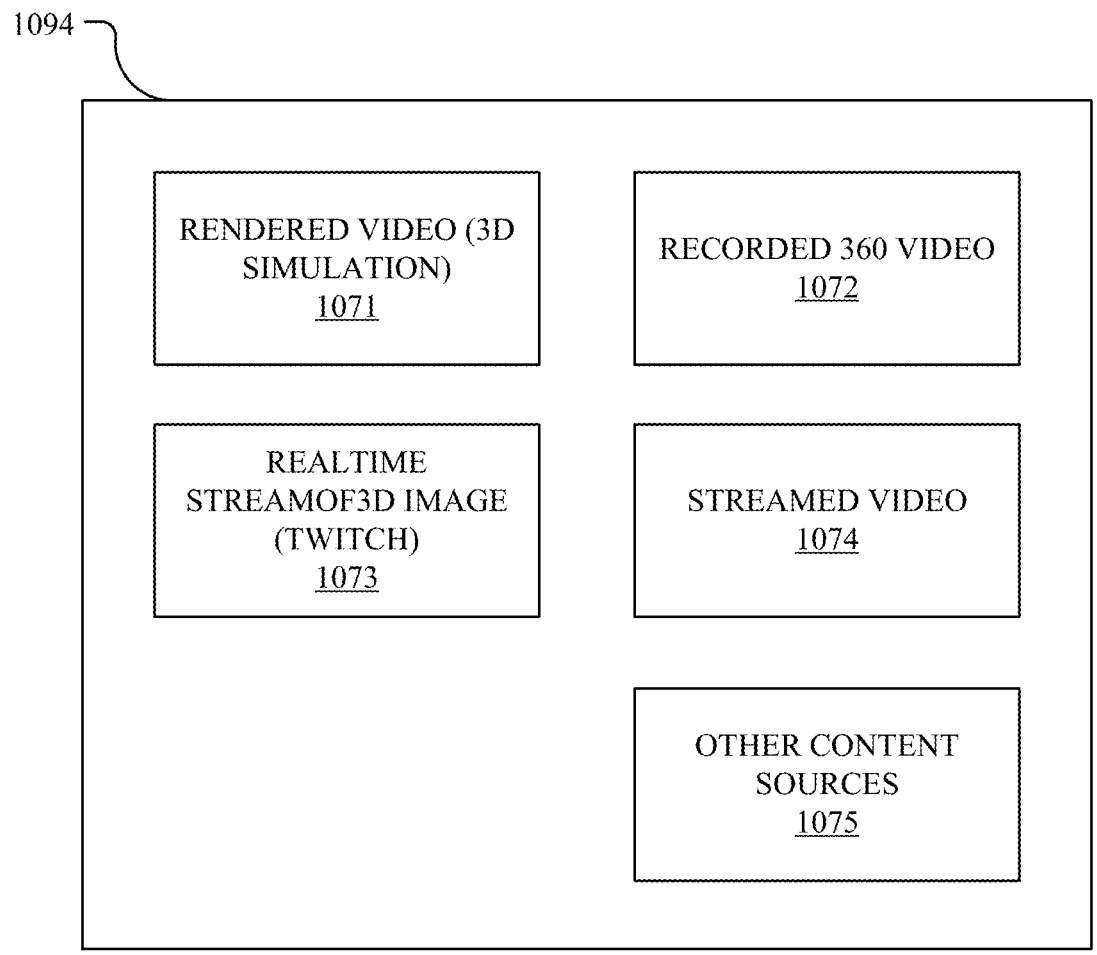
FIG. 10C illustrates an example content store.
Figure 10D:
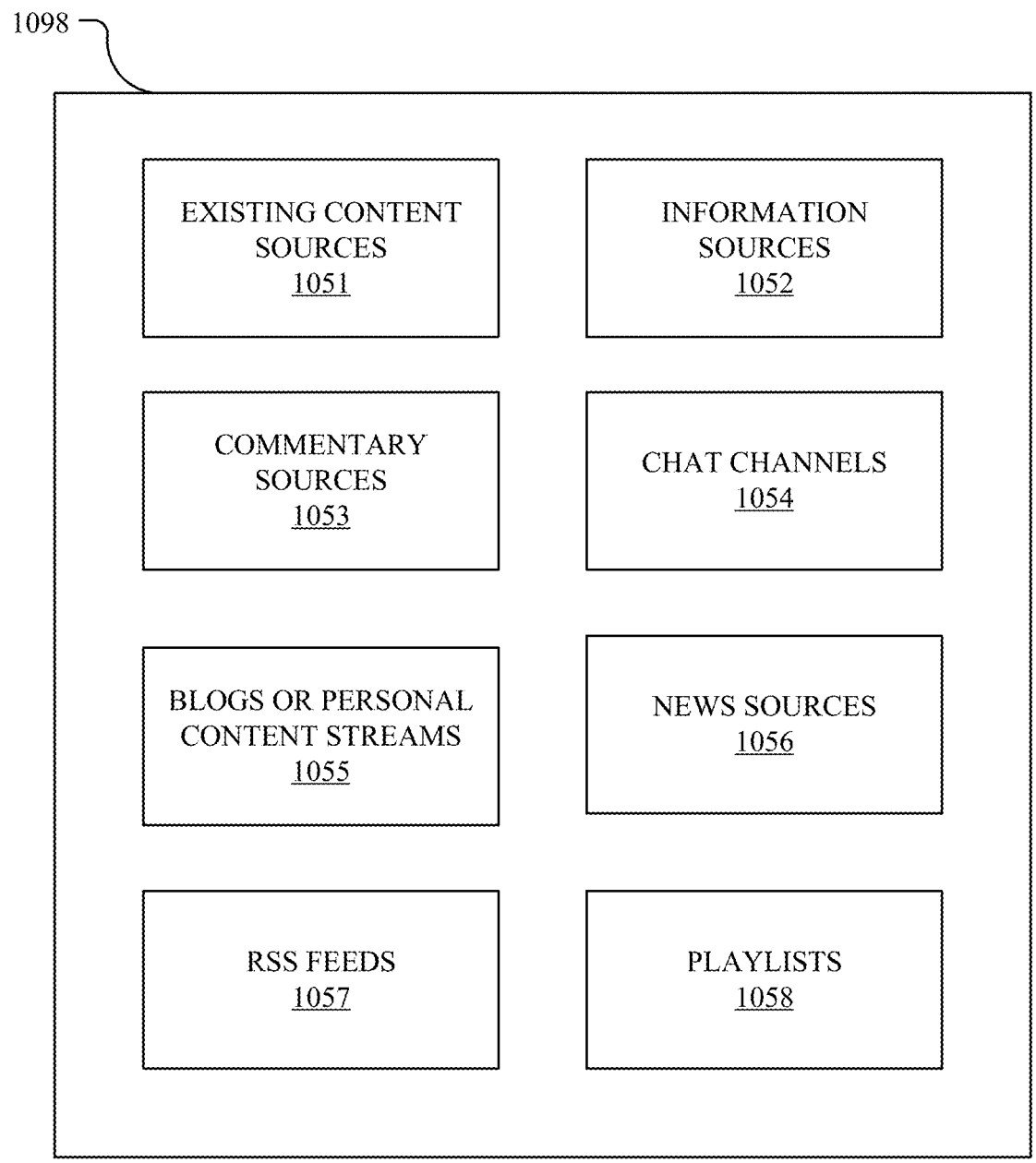
FIG. 10D illustrates an example metadata store.

FIG. 10B illustrates an example store for recognizers and classifiers 1092. The recognizer and classifiers 1092 may include, for example, but are not limited to, an OCR system 1061, an object recognition system 1062, a semantic context linking system, 1063, a scene recognition system 1064, a speed recognition system 1065, an age/gender/emotion recognition system 1066, an activity recognition system 1067, a motion tracking system 1068, a segmentation system 1069, or other recognizers and classifiers 1070. The subsystem, the classifiers, and the recognizers may be a hardware system, a software system, or a system with both hardware and software. FIG. 10C illustrates an example content store 1094. The content store 1094 may include, for example, but are not limited to, a rendered video (e.g., 3D simulation video) 1071, a recorded 360-degree video 1072, a real-time stream of 3D image (i.e., Twitch) 1073, a streamed video 1074, or other content sources 1075. FIG. 10D illustrates an example metadata store 1098. The metadata store 1098 may include, for example, but are not limited to, existing content sources 1051, information sources 1052, commentary sources 1053, chat channels 1054, blogs or personal content streams 1055, news sources 1056, RSS feeds 1057, playlists 1058, etc. Although this disclosure describes subsystems and stores having particular components, this disclosure contemplates subsystems and stores with any suitable components.

Particular embodiments of an AR system may allow the user to choose among layers of content and information annotated with images, such as images from 360-degree videos. By creating an AR user experience, the system may allow users to access virtual world content in the context of a 360-degree 3D video. The system may be a fully-automated system that uses a combination of machine learning and online sources—including user specific sources—in a way that quickly allows the creation of an augmented version of an image, such as images correspond to 360/3D video, without the requirement for time-consuming, expensive manual annotation and linking. The user modeling, preference, and subscription functions may further allow the user to guide the system, and allow the system to take an otherwise general set of data and create a highly personalized augmentation in real time. The social functionality allows the user to both subscribe to personalities and friends, and to virtually co-locate their interactions inside videos. The system is capable of turning a 360/3D video into a fully interactive forum without the need to place people in that scene like with MMO games, thus allowing even low-end VR devices to participate.

Example applications of the system may include but are not limited to blogs and web articles (e.g., look at a view of St. Petersburg and view annotations about invasions and attacks on the city), videos (e.g., look at a building and then see the time-lapse of its construction), comments (e.g., see comments on various items in the world), commentary in channels or forums (e.g., user may see all the comments by people from MIT, or people from Boston, or people from US), channels from famous people (e.g., what did Steven Spielberg say about various things), purchase information (e.g., where I can try out a shoe or how to buy the shoe online), activity search based on what people are doing at that location (e.g., in a game recording, people casting magic spells), or motion tracking (e.g., guided tours or paths highlighted by someone).

Particular embodiments of the system may allow users to remotely co-create and manipulate content with two or many people in different locations. Users may use the system to create content such as 3D models, 2D graphics, audio, and video content. Particular embodiments of the system may allow users to have conversations and interaction with others. The conversations and interaction may be initiated by notification or invitations to invite people into a common virtual space. The system may allow users to send messages into virtual environments or out into the world via mobile connection or desktop application. Content may be shared and received in both virtual environments or mobile connection or desktop application. Live environments or pre-recorded content may be streamed to multiple users. The users may switch view point in real time to multiple cameras at the events. Users and content creators may combine different environments into one single feed in order to create connections between multiple remote locations. Users may view multiple view points and locations at the same time.

As an example and not by way of limitation, the system may allow users to send and receive messages by displaying graphical indications of messages, on which when user clicks on one of the graphical indications, the message pops open. As another example and not by way of limitation, the system may associated an object with words and messages in audio that can be heard in snippets when the user's interacts with the object. As another example and not by way of limitation, the system may provide joint experience allowing many users to log into one place simultaneously. As another example and not by way of limitation, the system may allow a user to leave comments at a location. As another example and not by way of limitation, the system may allow user to leave a pointer with graphics for guidance in the AR environment.

As an example and not by way of limitation, the system may allow users to send and receive messages and notification within a VR environment. The system may allow a connection to APPS or websites that gets displayed in VR to notify users about what's going on. The system may notify users' friends to login in to a VR world to join the virtual environment and to share what the users are seeing. The system may allow users to split multiple live streaming events into one feed and provide the users with the ability to view two or more remote speakers in one seamless environment, such as, debate events, live music performances, meetings, or interviews. The system may allow users to conduct multi-person brainstorm. The system may display art gallery with different curator at each angle talking about art. When the viewer looks towards the curator, the curator may react and provide more information about art behind him. The system may broadcast and stream users' experience to the internet for others to watch what the users are watching and may enable thousands of people to watch the broadcasting stream. The system may allow users to invite others to join the VR experience by sending notification invitations, or directly abducting friends that is viewing another location to join right away.

The system may allow users to access annotation through information overlays. Annotations may be inserted and retrieved by the current user or other users through information overlays. Linked content, additional layers of information, video/audio content, related content, discovery/recommendation, location jump points may all be linked to the current content. Voice/audio command may be used to access, modify, and search the available information and the results may be shown via annotation or audio feedback. The system may allow users to perform collaborative or social networking by allowing multiple users at the same location or different locations to communicate, access, and modify the content at the same time. User may be presented multiple tools to interact with different layers of annotation to choose from. The system may allow users to gain deeper knowledge within the contents of current view/location. Cameras may be used to take snapshots of the view or the location to save or share. The system may cycle through different lenses of overlays/filters of information. Different lenses may be cycled through to alter, filter, or improve the visual and audio nature of the content. The system may allow users to save points by saving or sharing injected bookmarks, meta-tags, or other data into the scene. The system may have intelligent features for object recognition within the scene via computer vision and/or meta-data to provide meaningful suggestions and information to participants based on preferences. The system may allow users to construct or deconstruct the content by changing texture of objects, subjects, and background, replacing and/or moving elements within view.

As an example and not by way of limitation, the system may display stylized views of real world objects as x-ray vision of planes and other objects for education and demonstration. The system may allow users to show or see through into device, inside components of an engine or internal moving objects, or to see inside body of any living being or organisms. The system may allow users to record all movement data of participants to crowd source a heat map of attention. The system may use this heat map to guide users on interesting views based on crowd data to allow user to see what most others are seeing. The system may use audio or visual cues to indicate popularity. The system may allow users to click on the point to jump to another viewing angle or to transition to another popular location.

As another example and not by way of limitation, the system may allow users to tag a train and see where the locations all the trains are going. The system may allow uses to tag a plane and see the air plane's flight path. As another example and not by way of limitation, the system may shift cameras to allow viewers to change the camera lens digital to create different distortion of the view, or to change viewing angle of 25-100 mm lens digitally to create different experience for users. The system may change the background color to provide isolation to embellish an object. For example, the background may become black and white isolation to embellish an object. The system may use narration to provide color cues or use change object color or highlight object color to guide people. The system may isolate a subject by color change. As an example and not by way limitation, the system may add view effects such as heat map or coloring corresponding to an IR camera.

In particular embodiments, the system may allow user to perform file organization and storage using the same principle of annotation and interactive information. The viewer may use the entire spaces to organize content, tags, bookmarks, and files to create screens, folders, and links. As an example and not by way of limitation, the system may use a virtual space and information layer as unlimited display area for photo/video organization, grouping and compiling media without being limited by the screen size. The system may create folders, links, and access file systems similar to desktop operating systems.

Particular embodiments of the system may allow, at specific locations and events (e.g., sports), different views and information layers to be triggered by real time events and changes in information about the event. The system may enable geotagging and deep linking of virtual data by recording the position, location, elevation, and time of all gesture, text or audio inputs. The system may incorporate to services, such as, Yelp and Fandango for remoted AR, and AirBNB for trip planning. The system may allow search navigation by recognizing text and visual similarities to perform filtering and search within virtual environments. The system may allow hyperlinks which link objects and text throughout virtual environments. The system may generate new links based on text and object recognition through computer vision techniques. The system may allow timeline navigation by allowing users to scrub through time with an annotation/information layer via gesture or audio input. The system may allow multi narrative navigation for which different links may be available based on context, emotional metrics, and time to progress into multiple experiences.

As an example and not by way of limitation, the system may allow users to jump to different locations of a video. The viewer may move to different rooms to find clues to progress the story. Annotated layers may be used to display lyrics, visualization, musical instruments, screens, and holograms in the air to aid and improve experiences. The system may display comments, tweets, live feeds in space for social interaction. As another example, the system may give the user the ability to see the paths and formation information of each player in space. Audiences may customize and adjust various aspects and 2D/3D placements of the annotated layers. As another example, the system may allow different events to trigger certain features based on player positions, music cue, crowd reaction/sound, player or team stats, or position of camera viewing angle.

As an example and not by way of limitation, the system may observe and evaluate 3D scenes to get a better sense of the surroundings, better spatial understanding of places commonly traveled to, such as restaurants, hotels, even venues, and location scouting. As an example, the system may provide landscape popup and point of interest (POI) with ratings. As another example, the system may perform visual filtering and searching based on visual similarity. As another example, the system may allow uses to use audio or visual search commands like "show me something like this", "show me information about this object," or text to perform search in VR/AR environment. As another example, the system may bring up a timeline that users can scrub through with, e.g., a gesture. As another example, the system may provide storytelling in different POV (i.e. POV of protagonist). As another example, the system may allow users to discover different parts of the story when the viewer switches to different locations within the VR/AR. As another example, the system may allow everyone to contribute one part of the story by uploading a video and recording sound clips.

Particular embodiments of the system may allow users to annotate messages, reviews, photos, audio recordings and share with others, while the users are accessing VR/AR in the car. The system may allow users to see different view in VR/AR. As an example, GPS may be activated and the system may construct a world in the VR/AR environment that follows the movement of the GPS. For example, the car may be driving in the coast of California in the VR/AR environment when the car is actually in Michigan or Canada. As another example, the system may allow users to swap experience in a self-driving car. As another example, the system may allow users to switch to another user's view who is driving a car. The system may allow users to see someone else's driving view that happened on the same path as the user is. The system may allow users to share their driving experience to other people. The system may allow users to hear a comment said by someone else while driving on the same road or driving into another scene. As another example, the system may allow users to experience a virtual portal or gateway, which may take users to different virtual places, such as, a science museum, mars, POV of a mars rover, or other environment on mars. As another example, the system may allow users to watch a movie. The users may beam into recordings and the viewer can be taken to the real location where the movie was shot or recorded. Or the viewer may see the location and view all the movies that were shot/recorded at that place. The system may allow viewers to visit locations like Gotham city, LA River, etc., and see rich information about places. As another example, the system may allow users to see the creation process of the painting or other artwork in a museum, go into a painting, or be inside a painting in the VR/AR. As another example, the system may allow users to have curated museum tours in the VR/AR.

Particular embodiments may allow users to set meetings or hold conversations through the system. For example, the system may allow users to input or retrieve annotations and to share with other participants. The system may allow public information overlays to be viewable by all participants or selected participants. The system may allow user to view automatic or prepared notes in space, in which the notes may be anchored to related subjects or object. The system may allow users to record conversations or meetings including transcripts, graphics, facial expression, body language, and speech patterns. The system may apply information augmentation to prerecorded conversations as well as live conversations. The system may allow present participants who are not wearing a HMD to access the data after the event. The system may allow remote participants to view the content live while assist in providing more information for the intelligent augmentation. The system may provide live translation of all spoken words to inject captions anchored to each participant. The system may allow preloaded presentation, imagery, or materials to be loaded and presented as a layer during presentation.

As an example and not by way of limitation, the system may allow users to record VR/AR content, for example to collect and organize meeting notes as annotation layers, record spoken conversations from each participant, and transcribe and/or translate into written captions and notes during live or recorded sessions. The system may allow users to listen/watch conversations in real time, retrieve/display relevant information within the virtual environment to all participants, and highlight key information. The system may enable predefine knowledge modules to search specific databases like maps, Google, application screen, Wikipedia, health data, or geological data. As another example, the system may allow users to setup multi-participant conference for multiple people to meet in VR/AR. Audiences may sit in and view the meeting as if they are with the people in the meeting. The main meeting members may be at same actual space or at different places. If not in same space, the VR may combine views from the different places and create a VR/AR space to provide experiences to users as if they are in the same space. As another example, the system may allow musicians to play together in VR/AR.

Figure 11:
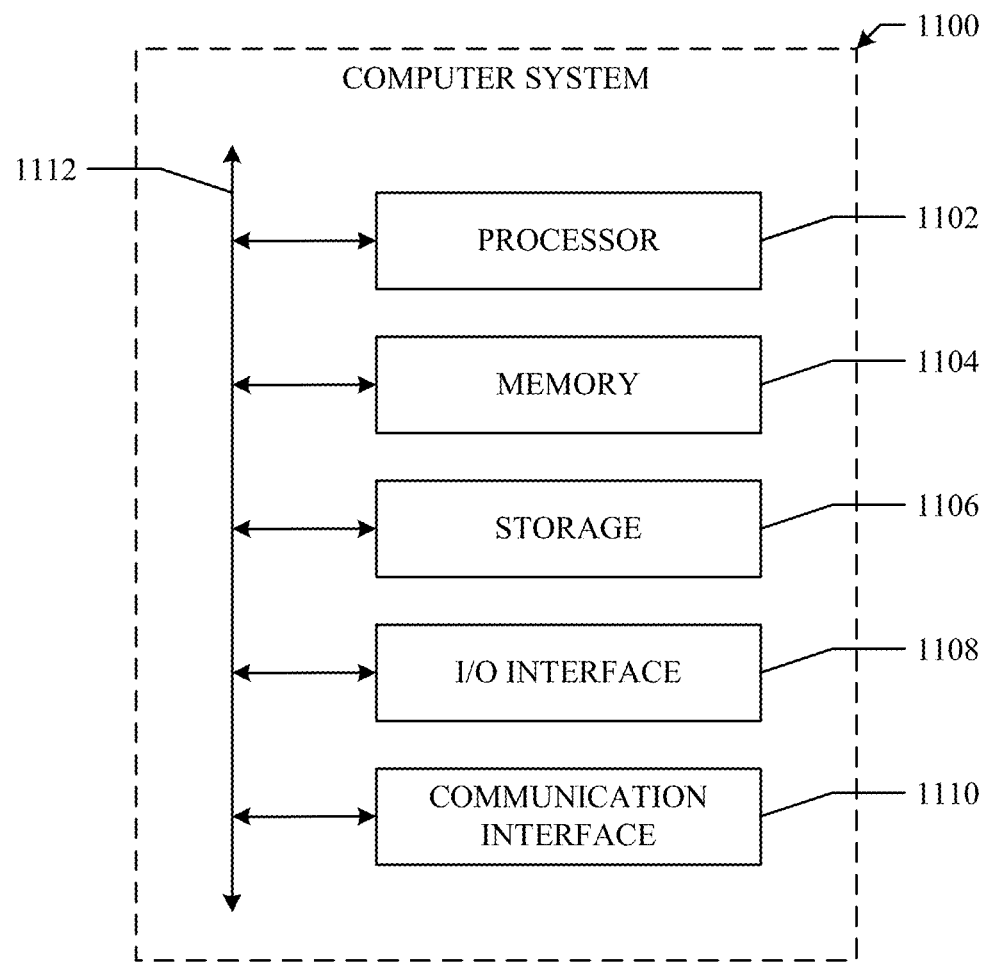
FIG. 11 illustrates an example computer system according to particular embodiments.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising: one or more processors; and a non-transitory memory coupled to the processors comprising instructions executable by the processors, the processors operable when executing the instructions to:
    sample a plurality of frames of media content with a sampling frame rate, each frame corresponding to at least part of an image from a scene in a video captured by one or more cameras;
    automatically detect one or more objects in at least one of the frames;
    for each of the detected objects, automatically associate an annotation corresponding to that object for display with the object, wherein each annotation comprises one or more graphical elements;
    determine whether there is global motion of the scene by detecting global changes in the frames corresponding to movement of the one or more cameras;
    determine whether there is local object motion by detecting movement of the one or more objects in the frames; and
    update each annotation in successive frames at a new sampling frame rate based on the determination that there is global motion and/or local object motion.

2. A method comprising, by a computing system:
    sampling a plurality of frames of media content with a sampling frame rate, each frame corresponding to at least part of an image from a scene in a video captured by one or more cameras;
    automatically detecting one or more objects in at least one of the frames;
    for each of the detected objects, automatically associating an annotation corresponding to that object for display with the object, wherein each annotation comprises one or more graphical elements;
    determining whether there is global motion of the scene by detecting global changes in the frames corresponding to movement of the one or more cameras;
    determining whether there is local object motion by detecting movement of the one or more objects in the frames; and
    updating each annotation in successive frames at a new sampling frame rate based on the determination that there is global motion and/or local object motion.

3. The method of claim 2, wherein:
the frames comprise a pair of stereoscopic frames; and
the method further comprises:
    generating a depth map based on an image disparity between the stereoscopic frames; and
    for at least one annotation, automatically associating that annotation with its corresponding object based at least in part on the depth map.

4. The method of claim 2, wherein at least one annotation is determined based on one or more metadata associated with that annotation's corresponding object.

5. The method of claim 4, further comprising:
displaying the frames of the media content to a user;
determining an interaction of the user with the media content; and
determining the one or more metadata based on the interaction of the user with the media content.

6. The method of claim 5, further comprising:
automatically identifying the one or more objects;
determining an annotation mask for a first identified object based on the interaction of the user with the media content; and
associating the annotation mask with the first identified object.

7. The method of claim 5, wherein the interaction of the user with the media content is determined based on output from one or more sensors of a head mounted display (HMD) worn by the user.

8. The method of claim 5, wherein the interaction of the user with the media content is determined based on one or more user inputs comprising:
a voice command;
a gesture;
a motion of a body part;
a state of a body part;
a direction of a body part;

a selection through a controller; or an indication of interest on a portion of the media content.

9. The method of claim 2, further comprising destitching each frame into a plurality of image tiles, wherein each frame comprises an equirectangular frame, and wherein each image tile comprises an RGB planar frame or a cubemap face image.

10. The method of claim 9, further comprising:
determining whether a key frame exists for the frames; and
in response to a determination that a key frame does not exist for the frames, identifying the frames as a key frame.

11. The method of claim 9, further comprising:
determining whether a key frame exists for the frames; and
in response to a determination that a key frame exists for the frames:
comparing each image tile to a corresponding second image tile from a previously accessed frame of the media content; and
detecting a change within at least one image tile relative to its corresponding second image tile from the previously accessed frame.

12. The method of claim 11, wherein the change comprises a movement of an object.

13. The method of claim 11, further comprising:
comparing the change to a threshold; and
in response to a determination that the change is greater than the threshold:
automatically identifying the one or more objects using one or more object classifiers; and
identifying the frames containing the change as a key frame.

14. The method of claim 11, further comprising:
comparing the change to a threshold; and
in response to a determination that the change is less than the threshold:
automatically identifying the one or more objects by accessing an identification for the one or more objects from the previously accessed frame; and
automatically determining the annotation corresponding to each of the one or more objects by accessing an annotation for each of the one or more objects from the previously accessed frame.

15. The method of claim 2, further comprising:
generating one or more binary masks for one or more regions in the frame; and
segmenting the frame based at least on the one or more binary masks of the frame.

16. The method of claim 15, wherein generating the binary mask comprises:
aligning the one or more regions in the frame;
coalescing one or more overlapping regions of the one or more regions;
converting contours of the coalesced overlapping regions to the one or more binary masks; and
merging the one or more binary masks into an output mask.

17. The method of claim 2, further comprising:
automatically identifying the one or more objects by:
determining a general class for the object based on a general classification model;
determining whether a specialized classification model exists for the general class of the object; and
when the general class of the object has a specialized classification model, determining a specialized class for the object based on the specialized classification model.

18. The method of claim 2, wherein the new sampling frame rate is determined based on parameters related to a motion vector of the global motion and/or parameters relative to motion vectors of the one or more objects in the frames.

19. The method of claim 2, wherein the new sampling frame rate comprises higher frame rates when more global change and/or movement of the one or more objects in the frames is detected.

20. One or more computer-readable non-transitory storage media embodying software that is operable when executed to:
sample a plurality of frames of media content with a sampling frame rate, each frame corresponding to at least part of an image from a scene in a video captured by one or more cameras;
automatically detect one or more objects in at least one of the frames;
for each of the detected objects, automatically associate an annotation corresponding to that object for display with the object, wherein each annotation comprises one or more graphical elements;
determine whether there is global motion of the scene by detecting global changes in the frames corresponding to movement of the one or more cameras;
determine whether there is local object motion by detecting movement of the one or more objects in the frames; and
update each annotation in successive frames at a new sampling frame rate based on the determination that there is global motion and/or local object motion.

* * * * *